US012564838B2

(12) United States Patent
Guan et al.

(10) Patent No.: US 12,564,838 B2
(45) Date of Patent: Mar. 3, 2026

(54) STEP-TYPE INERTIAL FOCUSING MICROFLUIDIC CHIP

(71) Applicant: SHENZHEN GENFLOW TECHNOLOGIES CO., LTD., Shenzhen (CN)

(72) Inventors: Guofeng Guan, Shenzhen (CN); Shuzhe Chao, Shenzhen (CN)

(73) Assignee: SHENZHEN GENFLOW TECHNOLOGIES CO., LTD., Shenzhen (CN)

( * ) Notice: Subject to any disclaimer, the term of this patent is extended or adjusted under 35 U.S.C. 154(b) by 567 days.

(21) Appl. No.: 18/138,026

(22) Filed: Apr. 21, 2023

(65) Prior Publication Data

US 2023/0256443 A1 Aug. 17, 2023

Related U.S. Application Data

(63) Continuation-in-part of application No. PCT/CN2021/081624, filed on Mar. 18, 2021.

(30) Foreign Application Priority Data

Oct. 26, 2020 (CN) ........................ 202011158150.7

(51) Int. Cl.
*B01L 3/00* (2006.01)

(52) U.S. Cl.
CPC . *B01L 3/502761* (2013.01); *B01L 2200/0652* (2013.01); *B01L 2300/0838* (2013.01); *B01L 2300/088* (2013.01)

(58) Field of Classification Search
CPC ..... B01L 2200/0652; B01L 2300/0838; B01L 2300/088; B01L 3/502761
See application file for complete search history.

(56) References Cited

U.S. PATENT DOCUMENTS

2015/0238963 A1* 8/2015 Han .......................... B03B 5/62 210/801
2016/0244714 A1* 8/2016 Spuhler .................... G01N 1/00

FOREIGN PATENT DOCUMENTS

CN 108132208 A * 6/2018 ............. G01N 15/10
CN 109082368 A * 12/2018 ............ C12M 23/16
CN 109012775 B 1/2024
JP 2004-354364 A 12/2004
JP 2013-127468 A 6/2013
JP 2015-535728 A 12/2015

(Continued)

*Primary Examiner* — Jennifer Wecker
(74) *Attorney, Agent, or Firm* — ScienBiziP, P.C.

(57) ABSTRACT

A step-type inertial focusing microfluidic chip includes an arc-shaped channel having multiple stages connected in series. At least one stage of the arc-shaped channel is separated into a plurality of sub-channels distributed along a radial direction, one end of the multistage arc-shaped channel is provided with at least one fluid inlet and an inlet channel connecting the end of to the fluid inlet. The other end of the multistage arc-shaped channel is provided with a plurality of fluid outlets and a plurality of outlet channels connecting the other end to the fluid outlets. A radius of curvature of the arc-shaped channel is 2 to 50 mm. A cross-sectional width is 50-5000 microns, the cross-sectional height is 20-2000 microns, and a thickness of a sub-channel separation wall in the arc-shaped channel having the sub-channels is 10 to 1000 microns.

9 Claims, 12 Drawing Sheets

(56) References Cited

FOREIGN PATENT DOCUMENTS

| | | | | |
|---|---|---|---|---|
| JP | 2020-95057 | A | 6/2020 | |
| JP | 2021-119004 | A | 8/2021 | |
| KR | 10-2016-0064768 | A | 6/2016 | |
| WO | WO-2019128841 | A1 * | 7/2019 | ............ G01N 15/10 |
| WO | 2021/080506 | A1 | 4/2021 | |

* cited by examiner

STEP-TYPE INERTIAL FOCUSING MICROFLUIDIC CHIP

FIELD

The present application relates to field of biological particle microfluidics, and more particularly, to a step-type inertial focusing microfluidic chip.

BACKGROUND

Among sorting methods based on physical features, the inertial focusing microfluidic technology has attracted wide attentions owing to its superior characteristics such as purely physical approach using fluid mechanics, ultra-high flow rates, and cross-sectional dimensions of a channel that avoid clogging. However, when the sample volume exceeds a certain value, the inertial focusing microfluidic technology still suffers from a bottleneck in throughput. The inertial focusing microfluidic chip with a single channel cannot achieve efficient sorting at a throughput of $10^9$/s, while multiple channels or multiple chips connected in parallel may suffer from problems such as complex design of channels and difficult processing and production.

SUMMARY

In order to overcome shortcomings of the existing art, the present application provides a step-type inertial focusing microfluidic chip, to achieve ultra-high throughput on concentration, liquid exchange, enrichment and sorting of multiple types of microparticles.

The step-type inertial focusing microfluidic chip provided in embodiments of the present application includes an arc-shaped channel which includes multiple stages connected in series, wherein at least one stage of the arc-shaped channel is separated into a plurality of sub-channels which are distributed along a radial direction of the arc-shaped channel, a first end of the arc-shaped channel is provided with at least one fluid inlet and an inlet channel connecting the first end to the fluid inlet, a second end of the arc-shaped channel is provided with a plurality of fluid outlets and a plurality of outlet channels, the plurality of outlet channels connects the second end to the plurality of fluid outlets; a radius of curvature of the arc-shaped channel is 2 to 50 mm; a cross-sectional dimension of the arc-shaped channel along the radial direction of the arc-shaped channel is defined as a cross-sectional width, a dimension of the arc-shaped channel in a normal direction to the radial direction is defined as a cross-sectional height, the cross-sectional width is 50 to 5000 microns, the cross-sectional height is 20 to 2000 microns, and a thickness of a sub-channel separation wall of each of the plurality of sub-channels is 10 to 1000 microns.

Optionally, the arc-shaped channel forms at least one spiral, and curving directions at different stages of the arc-shaped channel are the same as curving directions of the least one spiral.

Optionally, the multistage arc-shaped channel forms a plurality of spirals, adjacent ones of the plurality of spirals are connected through a serially connected channel, and a shape of the serially connected channel is a straight line or a curve.

Optionally, a cross-sectional shape of each of the plurality of sub-channels includes at least one of a rectangle, a right-angled trapezoid, and a right-angled triangle.

Optionally, two stages of the arc-shaped channel which are connected to each other are connected directly or in a transitional manner through a straight channel.

Optionally, a quantity of the multiple stages of the arc-shaped channel is not less than a quantity of the plurality of fluid outlets, a quantity of the plurality of sub-channels of at least one stage of the arc-shaped channel is not less than the quantity of the plurality of fluid outlets.

Optionally, different stages of the arc-shaped channel each having the plurality of sub-channels are successively connected in series.

Optionally, a last stage of the multiple stages of the arc-shaped channel is provided with the plurality of sub-channels.

Optionally, the plurality of outlet channels is distributed in sequence at an output tail end of a last stage of the arc-shaped channel along a radial direction of the last stage of the arc-shaped channel; and each of the plurality of outlet channels drains outwards through a respective one of the plurality of fluid outlets.

Optionally, the first end of the arc-shaped channel is provided with a plurality of the fluid inlets and a plurality of the inlet channels, the plurality of inlet channels are distributed in sequence at an input end of a first stage of the arc-shaped channel along a radial direction of the first stage of the arc-shaped channel; one of the inlet channels located on an innermost side or an outermost side along the radial direction of the first stage of the arc-shaped channel is a buffer inlet channel; and each of the plurality of inlet channels drains inwards through a respective one of the plurality of fluid inlets.

The one or more technical solutions provided in embodiments of the present application at least have the following technical effects or advantages:

A sample is introduced into the multistage arc-shaped channel from a fluid inlet, and in the process of migration behavior caused by inertial focusing, the microparticles in the sample are differentially represented in the sub-channel of the arc-shaped channel according to their own dimension differences, and through a transition effect at the connecting position of each stage of arc-shaped channel, sorting of microparticles in the same sub-channel and convergence of microparticles in different sub-channels are achieved, thereby satisfying the requirements of concentration, liquid exchange, enrichment and sorting operations at a high throughput. The overall structure is simple and easy to process and produce.

BRIEF DESCRIPTION OF THE DRAWINGS

In order to more clearly illustrate technical solutions of the embodiments of the present application, a brief introduction will be given below on the drawings required to be used in the embodiments. It should be understood that the following drawings merely show certain embodiments of the present application and therefore should not be deemed as limiting the scope. For those skilled in the art, other relevant designs may further be obtained from these drawings without any creative effort.

REFERENCE NUMERALS OF MAIN ELEMENTS

11—arc-shaped channel, 11A—multichannel arc-shaped channel, 11B—single-channel arc-shaped channel, 111—sub-channel, 112—sub-channel separation wall, 12—connecting position, 13—fluid inlet, 14—fluid outlet, 15—straight channel, 16—inlet channel, 17—outlet channel, 1*a*—spiral.

DETAIL DESCRIPTION

It should be noted that when an element is said to be "fixed" to another element, the element may be directly on the other element or an intermediate element may exist as well. When an element is said to be "connected" to another element, the element may be directly connected to the other element or an intermediate element may exist simultaneously. Conversely, when an element is said to be "directly on" another element, no intermediate element exists. The terms like "vertical", "horizontal", "left", "right" and similar expressions used herein are for illustrative purposes only.

Unless otherwise defined, all the technical and scientific terms used herein have the same meanings as those ordinarily understood by those skilled in the art in the technical field to which this application belongs. The terms used herein are merely for the purpose of describing specific embodiments and are not intended to limit the present application. The term "and/or" as used herein includes any and all combinations of one or more related listed items.

Figure 1:
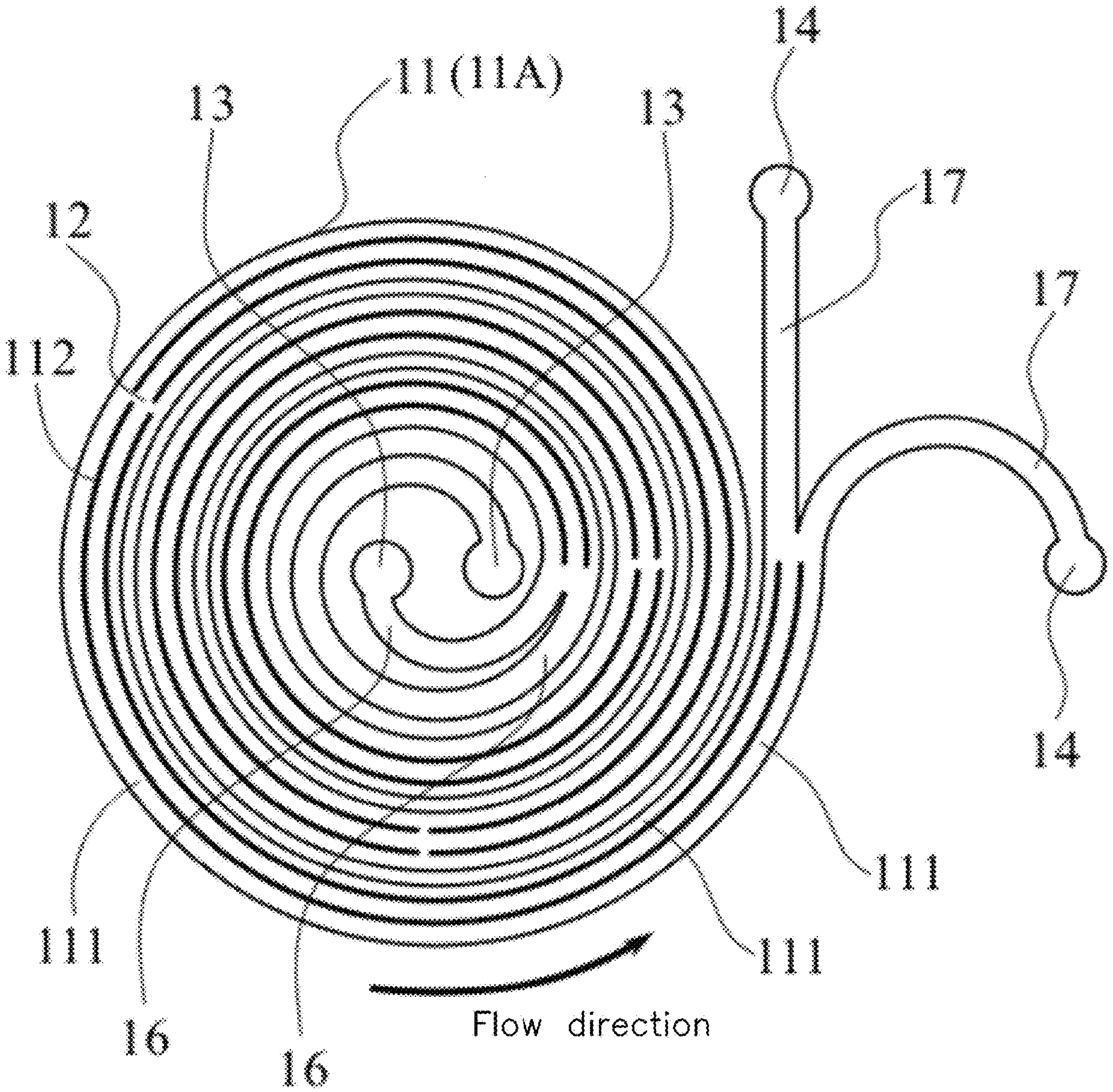
FIG. 1 is a structural schematic diagram of a step-type inertial focusing microfluidic chip provided in the embodiments of the present application.

Referring to FIG. 1, the present embodiment discloses a specific structure of a step-type inertial focusing microfluidic chip, including an arc-shaped channel 11 including multiple stages connected in series (hereinafter, multistage arc-shaped channel 11). At least one stage of the arc-shaped channel 11 is separated into multiple sub-channels 111 that are distributed along a radial direction of the arc-shaped channel 11 to form a multichannel arc-shaped channel 11A. One end of the multistage arc-shaped channel 11 is provided with at least one fluid inlet 13, and the other end is provided with multiple fluid outlets 14. The radius of curvature of any stage of the arc-shaped channel 11 is 2 to 50 mm, for example, 2 mm, 3 mm, 5 mm, 8 mm, 10 mm, 15 mm, 20 mm, 26 mm, 32 mm, 40 mm, 45 mm, and 50 mm, etc. The direction of any point on the arc-shaped channel 11 along the direction of its radius of curvature at that point is its radial direction at that point, and the direction perpendicular to its tangential direction (i.e., the main flow direction of the liquid in the channel) and the radial direction at that point is its normal direction at that point. The cross-sectional dimension of the cross section of the arc-shaped channel 11 along the radial direction of the arc-shaped channel is the cross-sectional width, while the dimension along a normal direction of the arc-shaped channel is the cross-sectional height (or called the cross-sectional depth). The range of the cross-sectional width is 50-5000 microns, such as 50 microns, 80 microns, 100 microns, 200 microns, 500 microns, 800 microns, 1000 microns, 1200 microns, 1500 microns, 2000 microns, 3000 microns, 4000 microns, and 5000 microns, etc. The range of the cross-sectional height is 20-2000 microns, such as 20 microns, 30 microns, 50 microns, 75 microns, 100 microns, 150 microns, 185 microns, 250 microns, 400 microns, 700 microns, 1200 microns, 1700 microns, and 2000 microns, etc. The thickness of a sub-channel separation wall 112 of the arc-shaped channel 11A having multiple sub-channels 111 is 10 to 1000 microns, such as 10 microns, 20 microns, 30 microns, 50 microns, 80 microns, 100 microns, 120 microns, 200 microns, 500 microns, 800 microns, 900 microns, and 1000 microns, etc.

Under such a limited dimension condition, components of different microparticles sorted through the multistage arc-shaped channel 11 are output from different fluid outlets 14, to achieve the purposes of enrichment and sorting. It may be understood that, if waste liquid remains after sorting through the multistage arc-shaped channel 11, the waste liquid is discharged from a fluid outlet 14. Exemplarily, FIG. 1 shows an exemplary example of four stages of arc-shaped channel 11*s*, and each stage of the arc-shaped channel 11 has three sub-channels 111 (i.e., having a four stages of multichannel arc-shaped channel 11A), wherein two fluid inlets 13 and inlet channels 16 and two fluid outlets 14 and outlet channels 17 are respectively available.

The sample fluid is introduced from the fluid inlet 13 into the multistage arc-shaped channel 11, and the arc-shaped channel 11 is configured to achieve a Dean vortex of the sample fluid, such that the sample fluid creates a regular accompanying motion when the sample fluid flows along the arc-shaped channel 11. Under the effect of the Dean vortex and fluid inertial forces, at least one type of microparticles in the sample fluid undergo migration behavior perpendicular to the main flow direction within the cross section of the channel, thereby achieving inertial focusing. Wherein the main flow direction is the flow direction of the sample fluid along the arc-shaped channel 11, and the cross section of the channel is perpendicular to the main flow direction.

Figure 11:
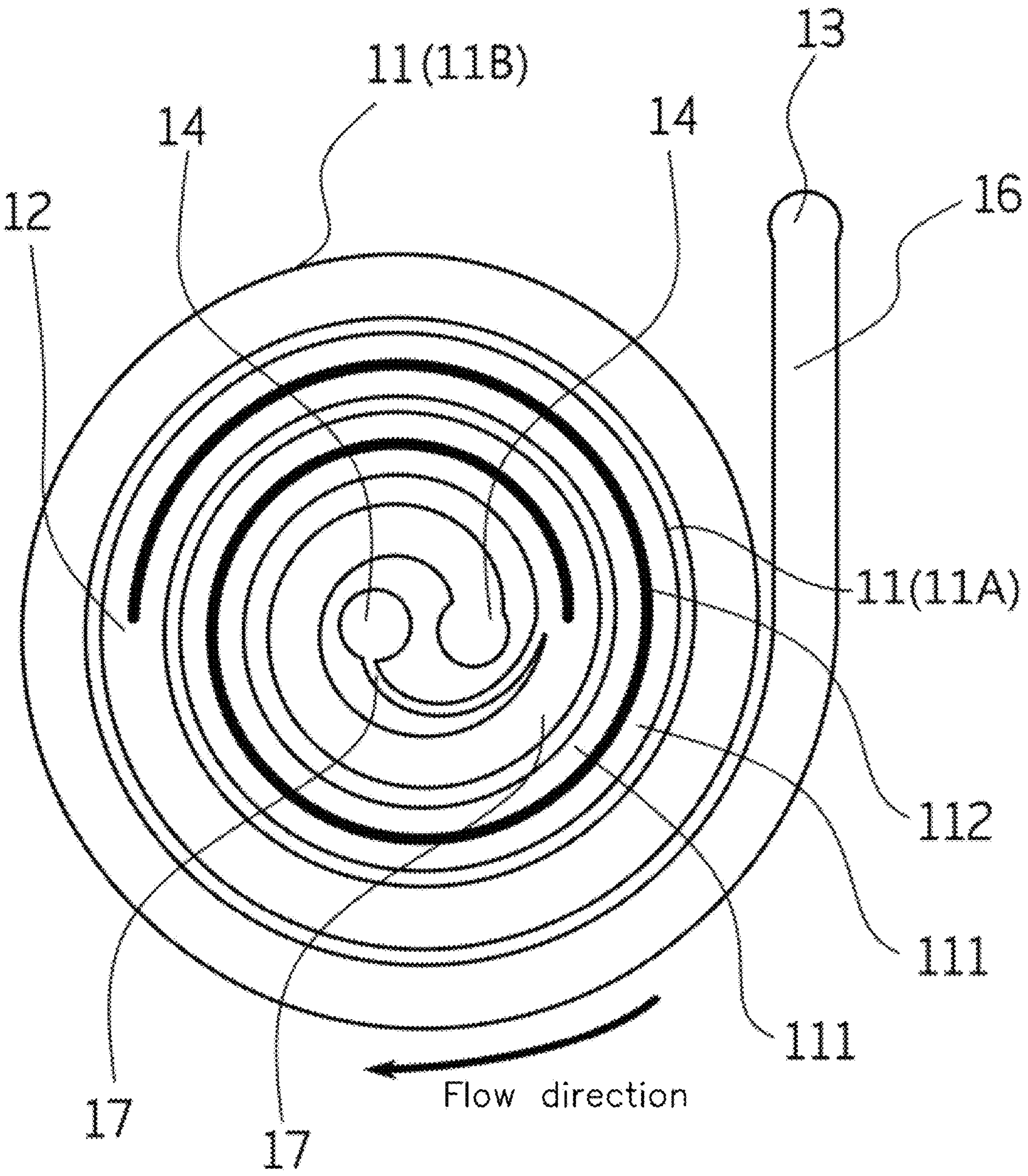
FIG. 11 is a structural schematic diagram of yet another structure of a step-type inertial focusing microfluidic chip provided in the embodiments of the present application.

Referring to FIG. 11, it should be noted that, the arc-shaped channel 11 may be distinguished into a multichannel arc-shaped channel 11A having at least two sub-channels 111 and a single-channel arc-shaped channel 11B having no sub-channel. Specifically speaking, the single-channel arc-shaped channel 11B has only one channel. In the aforementioned multistage arc-shaped channel, the multichannel arc-shaped channel 11A may be only one stage, or, typically, may be multiple stages. When the number of the stage(s) of the multichannel arc-shaped channel 11A is plural, the plural stages of the multichannel arc-shaped channel 11A may be successively connected in series, or they may not be directly connected to each other, or several stages may be directly connected and the remaining stages may not be directly connected. It should be understood that, the sub-channels 111 of the multichannel arc-shaped channel 11A are also curved in an arc shape. In the aforementioned multistage arc-shaped channel, the number of the single-channel arc-shaped channel 11B may be only one stage, or may be multiple stages, or may be zero.

Figure 2A:
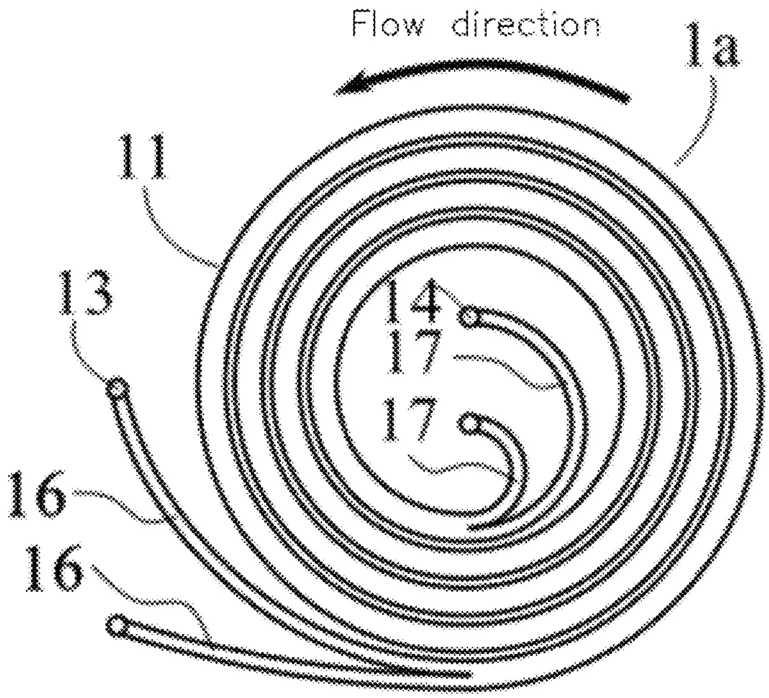
FIG. 2A is a schematic diagram of a single-spiral structure of a step-type inertial focusing microfluidic chip provided in the embodiments of the present application (the distribution of sub-channels is not shown)
Figure 2B:
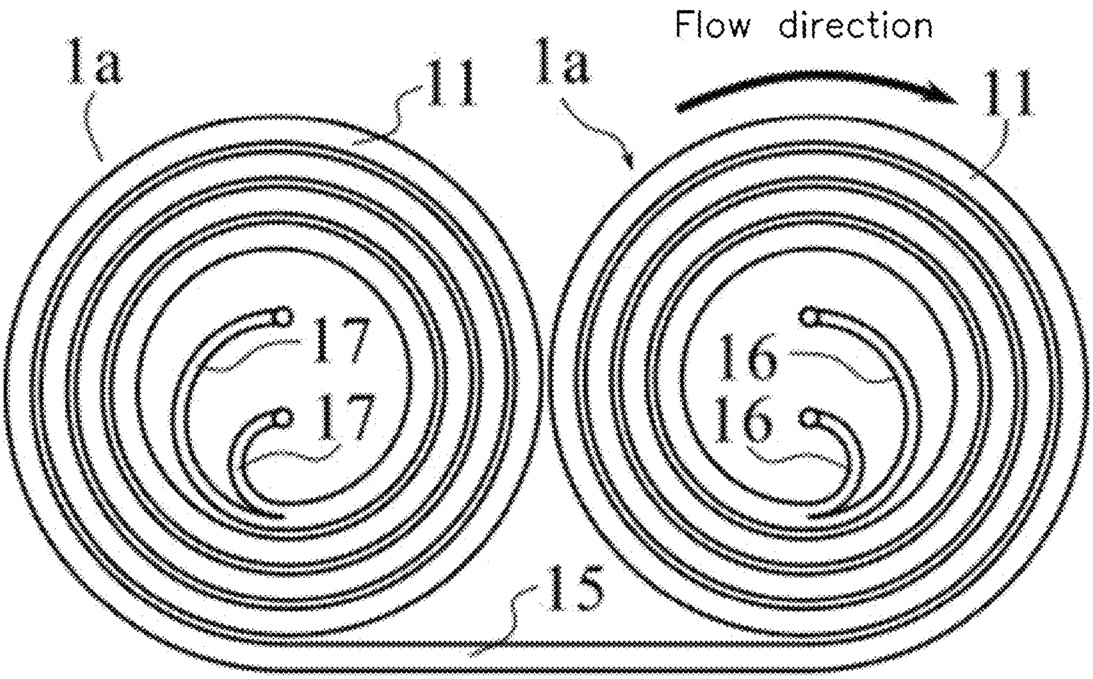
FIG. 2B is a schematic diagram of a multi-spiral structure of a step-type inertial focusing microfluidic chip provided in the embodiments of the present application (the distribution of sub-channels is not shown)

Exemplarily, the multistage arc-shaped channel 11 forms at least one spiral 1*a*, which may be a single spiral 1*a* (FIG. 2A), or may also be multiple spirals 1*a* (FIG. 2B). The curved directions of the arc-shaped channel 11 belonging to the same spiral 1*a* are the same, to form a multiple turns of spirals 1*a*, and satisfy the requirement of layout and the requirement of the channel to generate the Dean vortex. Referring to FIG. 2B, when the multistage arc-shaped channel 11 forms multiple spirals 1*a*, adjacent spirals 1*a* are connected through a serially connected channel; wherein the serially connected channel may be a straight channel 15 or a curved channel. Under the layout of multiple spirals 1*a*, the length of the channel of a single spiral 1*a* is controlled to be within a better range, thereby dramatically lowering the driving pressure required at the upstream of a microfluidic device.

Exemplarily, two stages of the arc-shaped channel 11 which are connected to each other are connected directly or are connected in a transitional manner through a straight channel 15. For example, in the same spiral 1*a*, the two stages of the arc-shaped channel 11 which are connected to each other are connected directly; for another example, the two stages of the arc-shaped channel 11 which belong to different spirals 1*a* and which are connected to each other may be connected in transition through a straight channel 15.

Exemplarily, multiple outlet channels 17 are distributed in sequence at an output tail end of the last stage of the arc-shaped channel 11 along a radial direction of the last stage of the arc-shaped channel 11, thereby ensuring that various types of microparticles after inertial focusing enrichment and sorting accurately enter the corresponding outlet channels 17. Wherein any of the outlet channels 17 drains outwards through a fluid outlet 14, thus, the microparticles can be drained and outputted outwards.

Exemplarily, one end of the multistage arc-shaped channel 11 is provided with multiple fluid inlets 13 and inlet channels 16, and multiple inlet channels 16 are distributed in sequence at an input end of the first stage of the arc-shaped channel 11 along a radial direction of the first stage of the arc-shaped channel 11, thereby ensuring that various types of inlet solutions (such as sample fluid and buffer) are introduced into the multistage arc-shaped channel 11 without interfering with each other. Exemplarily, among multiple inlet channels 16, the inlet channel located on the innermost side or the outermost side along the radial direction of the first stage of the arc-shaped channel 11 is a buffer inlet, thereby ensuring that the buffer is arranged on the innermost side or the outermost side of the arc-shaped channel 11 when the buffer is introduced and ensuring corresponding buffer effect. Generally, when the target particles to be enriched are the larger particles in the sample fluid, among the multiple inlet channels 16, the inlet channel arranged on the innermost side is taken as a buffer inlet channel; and when the target particles to be enriched are the smaller particles in the sample fluid, among the multiple inlet channels 16, the inlet channel arranged on the outermost side is taken as a buffer inlet channel. Wherein any inlet channel 16 extends outwards through a fluid inlet 13, to ensure a better introducing effect.

Any stage of the multichannel arc-shaped channel 11A may at least achieve transition sorting of one type of microparticles, the transition sorting of the target microparticles is achieved through the transition focusing effect of the multistage multichannel arc-shaped channel 11A, and at least one stage of the multichannel arc-shaped channel 11A has a sufficient number of sub-channels 111, to form the corresponding number of types of sorting liquid, and finally obtain the sorting liquid of multiple types of microparticles, and the sorting liquid flows out through different fluid outlets 14, to satisfy the requirement of sorting. If each type of microparticles in the sample fluid are sorted out, then multiple completely independent target liquid is formed, each target liquid contains only one type of microparticles or most of the target liquid is one type of microparticles, and the sorting liquid includes only the aforementioned multiple target liquid and does not contain the waste liquid. If only one or several types of microparticles need to be sorted out from the sample fluid, then one target liquid and one waste liquid, or several completely independent target liquid and one waste liquid will be generated, and at this time, the sorting liquid includes both the target liquid and the waste liquid.

Exemplarily, the number of sub-channels 111 of two stages of the multichannel arc-shaped channel 11A which are connected to each other is the same, thereby satisfying the requirement of transition and keeping the structure to be neat and simple. Of course, the number of sub-channels 111 of two stages of the multichannel arc-shaped channel 11A which are connected to each other may also be different.

Exemplarily, different stages of the multichannel arc-shaped channel 11A are connected in series successively in sequence, thereby ensuring successive transition of microparticles, achieving rapid and accurate sorting, and ensuring performance, efficiency and favorable effect of the ultra-high throughput of microfluidics.

In some embodiments, the multistage arc-shaped channel includes at least two stages of multichannel arc-shaped channel 11A which are connected to each other, for example, two stages, three stages or five stages of multichannel arc-shaped channel 11A which are connected successively may exist.

Taking three stages of arc-shaped channel (i.e., three stage of multichannel arc-shaped channel 11A) which are connected successively and have sub-channels respectively existing in the multistage arc-shaped channel as an example, the first stage of the multichannel arc-shaped channel and the second stage of the multichannel arc-shaped channel in the three stages of multichannel arc-shaped channel 11A are two stages of arc-shaped channel which are connected to each other. The second stage of the multichannel arc-shaped channel and the third stage of the multichannel arc-shaped channel are also two stages of the arc-shaped channel which are connected to each other.

Wherein the flow rate configuration of the sub-channel 111 of the front and rear stages of the multichannel arc-shaped channel has a great influence on the transition phenomenon. The flow rate of the sub-channel 111 is related to a variety of factors, for example, the cross-sectional state, the length of the channel and the distribution position of the sub-channel 111. The cross-sectional state includes cross-sectional shape and cross-sectional dimension, and the cross-sectional dimension includes cross-sectional width and cross-sectional height, and the dimension of the cross section of the channel along the radial direction of the channel is the cross-sectional width, and the dimension along a normal direction of the channel is the cross-sectional height. By designing the above characteristics of the sub-channel 111, the flow rate of the corresponding sub-channel 111 of the front and rear stages of the arc-shaped channel may be differentiated to provide conditions for transition of microparticles. In the embodiments of the present application, the way of designing the flow rate of the sub-channel 111 is not limited, as long as the flow requirements of a fluid layer at the aforementioned connecting position may be satisfied.

In some embodiments, the cross-sectional state of the sub-channel 111 may be designed. Exemplarily, the cross-sectional shape of the sub-channel 111 includes at least one of a rectangle, a right-angled trapezoid, and a right-angled triangle. For example, the cross-sectional shape of a certain sub-channel 111 may be any of a rectangle, a right-angled trapezoid, and a right-angled triangle, may also be a combination of any two of a rectangle, a right-angled trapezoid, and a right-angled triangle, and may also be the combination of the three shapes including a rectangle, a right-angled trapezoid, and a right-angled triangle. Exemplarily, the cross-sectional shape of each sub-channel 111 of the same stage of the arc-shaped channel 11 may be different, and the cross-sectional dimension of each sub-channel 111 with the same cross-sectional shape may also be different. Exemplarily, the cross-sectional shape and the cross-sectional dimension of each sub-channel 111 of different stages of arc-shaped channel 11 may be different. Exemplarily, FIGS. 3*a* to 3*b* show exemplary examples of cross-sectional states of several sub-channels 111.

Figure 3A:
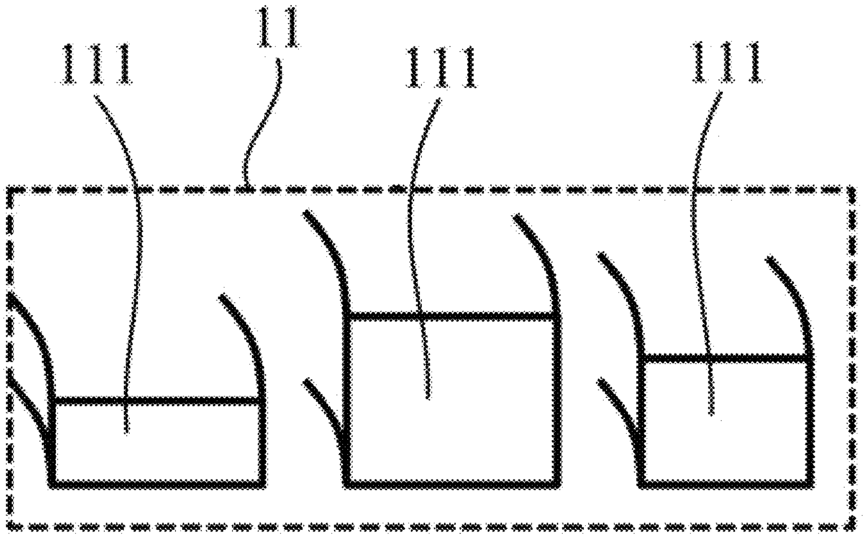
FIG. 3A is a schematic diagram of a cross-sectional shape of a sub-channel of a step-type inertial focusing microfluidic chip provided in the embodiments of the present application.

Referring to FIG. 3A, in the present example, the arc-shaped channel 11 has three sub-channels 111, the cross-sectional shapes of all the sub-channels 111 are all rectangles, but the cross-sectional dimensions are different.

The applicant found that, in the above channel with a rectangular cross section, in a certain flow rate range, larger microparticles are focused adjacent to an inner boundary of the channel along the curved direction, and is manifested in the top view as a focus line formed near the inner boundary adjacent to the curved direction of the channel; the smaller microparticles will move along with the Dean vortex at a relatively constant velocity in the cross section of the channel, and is manifested in the top view as oscillating periodically at the boundaries on both sides of the channel along the curved direction.

Figure 3B:
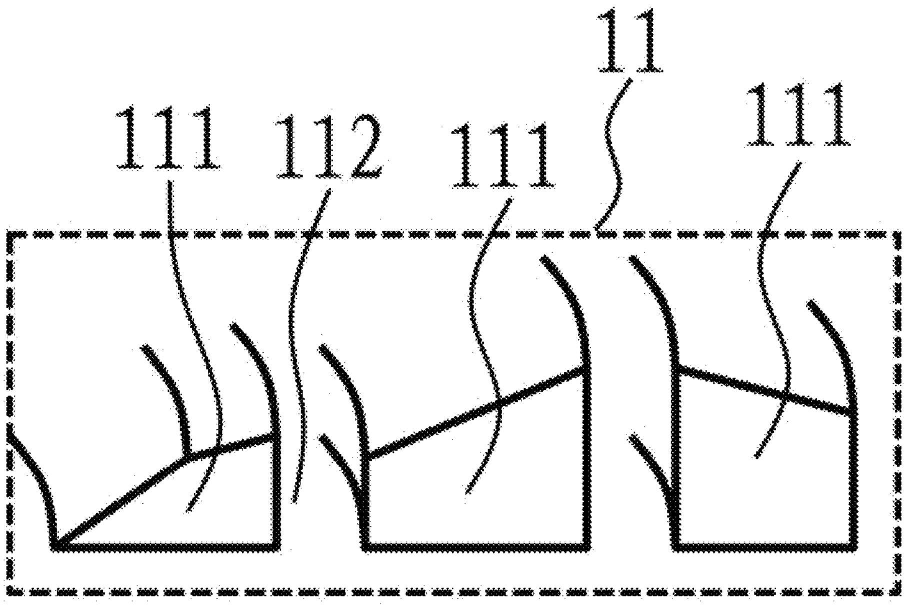
FIG. 3B is a schematic diagram of another cross-sectional shape of a sub-channel of a step-type inertial focusing microfluidic chip provided in the embodiments of the present application.

Referring to FIG. 3B, in the present example, the multichannel arc-shaped channel 11A has three sub-channels 111, the cross-sectional shapes of two sub-channels 111 on one side are both right-angled trapezoids with the inner side and the outer side of the curved direction as the base and the width direction as the height, and the cross-sectional shape of the other sub-channel 111 is a combination of a right-angled trapezoid and a right-angled triangle. Exemplarily, the sub-channel 111 with a combined cross section of a right-angled trapezoid and a right-angled triangle is the sub-channel 111 on the innermost side along the radial direction of the multichannel arc-shaped channel 11A. Wherein two sub-channels 111 with a right-angled trapezoid cross section are featured as follows: the height of the cross section of the inner sub-channel 111 adjacent to the inner side of the channel along the curved direction is smaller, while the height of the cross section adjacent to the outer side of the channel along the curved direction is larger, thereby showing a cross-sectional characteristic of shallow inside and deep outside, and the cross-sectional height of the outer sub-channel 111 adjacent to the inner side of the channel along the curved direction is larger, while the cross-sectional height adjacent to the outer side of the channel along the curved direction is smaller, thereby showing a cross-sectional characteristic of deep inside and shallow outside.

The applicant found that, in a channel with a cross section which is shallow inside and deep outside, in a certain flow rate range, larger microparticles are focused adjacent to an inner boundary of the channel along the curved direction, and is manifested in the top view as a focus line formed near the inner boundary adjacent to the curved direction of the arc-shaped channel 11; the Dean vortex in the outer deeper region is more dramatic, and under its influence, the smaller particles are locked adjacent to the outer boundary of the curved direction of the channel, and is manifested in the top view as a focus line formed near the outer boundary adjacent to the curved direction of the arc-shaped channel 11. In the channel with a cross section which is deep inside and hollow outside, within the range of most of the flow rate, all the microparticles will be maintained near the inner boundary of the curved direction of the channel under the joint effect of the inertial focusing and the confinement of the Dean flow, and is manifested in the top view as a focus line formed near the inner boundary adjacent to the curved direction of the channel.

Exemplarily, the number of stages of the arc-shaped channel 11 is not less than the number of fluid outlets 14. For example, when the number of the fluid outlets 14 is two, the microfluidic chip has at least two stages of the arc-shaped channel 11. Exemplarily, the number of sub-channels 111 of at least one stage of the arc-shaped channel 11A is not less than the number of fluid outlets 14. For example, when the number of the fluid outlets 14 is two, at least one stage of arc-shaped channel 11 has at least two sub-channels 111, or more than two stages of the arc-shaped channel 11 have at least two sub-channels 111. Namely, more than two stages of the arc-shaped channel 11 have sub-channels 111 with the number being not less than the number of fluid outlets 14.

Figure 4:
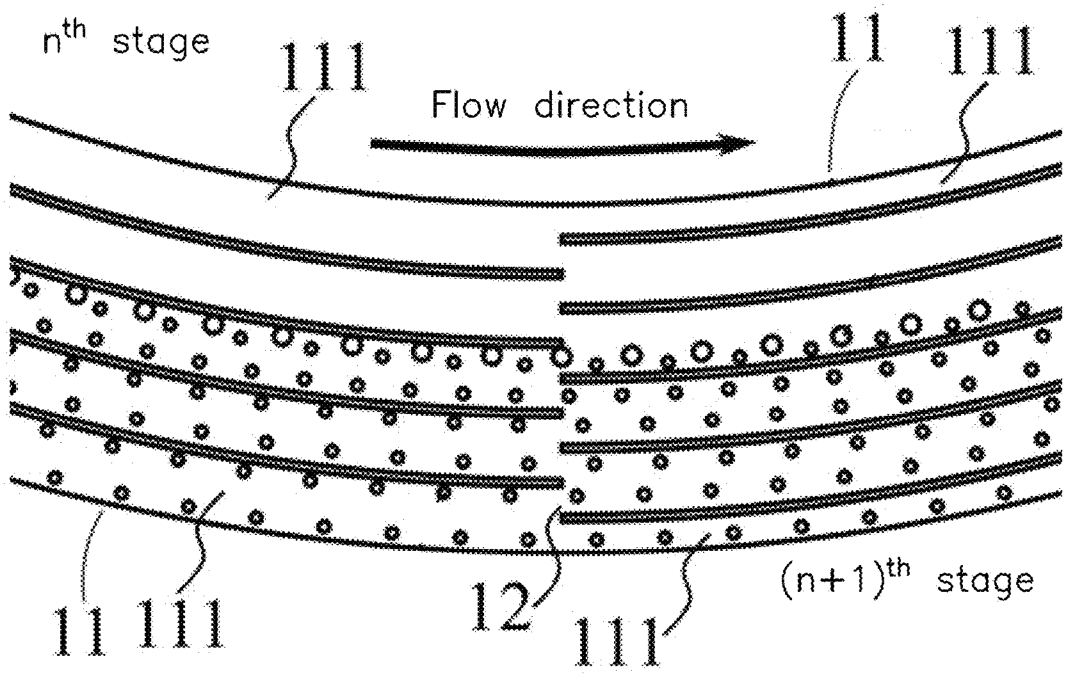
FIG. 4 is a partial schematic diagram of a structure of a step-type inertial focusing microfluidic chip provided in the embodiments of the present application.

As an application example of the structure shown in FIG. 4, during use, the sample fluid is introduced from the inlet channel 16 arranged on the outer side of the arc-shaped channel 11 along the curved direction and the fluid inlet 13 communicated thereto, and the buffer is introduced from the inlet channel 16 arranged on the inner side of the arc-shaped channel 11 along the curved direction and the fluid inlet 13 communicated thereto. After the transition effect of the previous $(n-1)^{th}$ stage of the arc-shaped channel 11, microparticles in the sample are located in three sub-channels 111 on the outer side of the $n^{th}$ stage of the arc-shaped channel 11 along the curved direction, and the buffer fills the two sub-channels 111 on the inner side. Wherein all the microparticles with a larger particle size and some microparticles with a smaller particle size are located in a middle sub-channel adjacent to the inner side of the curved direction of the arc-shaped channel 11 (the third sub-channel 111 counted from the outside to the inside, the same below), and the remaining microparticles with a smaller particle size are located in the two sub-channels 111 on the outermost side of the arc-shaped channel 11 along the curved direction after the previous $(n-1)^{th}$ stage transition sorting. In the middle sub-channel, due to the joint effect of inertial focusing and Dean drag force, larger microparticles are all located on the inner side of the sub-channel 111, while smaller microparticles are distributed all over the sub-channel 111. When all the liquid passes through the connecting position 12 of the $n^{th}$ stage of the arc-shaped channel 11 and the $(n+1)^{th}$ stage of the arc-shaped channel 11 to enter the $(n+1)^{th}$ stage of the arc-shaped channel 11, liquid in the middle sub-channel of the $n^{th}$ stage of the arc-shaped channel 11 is shunted clearly: all the larger microparticles in the sub-channel 111 transition into the more inner sub-channel 111 (the fourth sub-channel 111 counted from the outside to the inside) of the $(n+1)^{th}$ stage of the arc-shaped channel 11, while the smaller microparticles still enter the middle sub-channel of the $(n+1)^{th}$ stage of the arc-shaped channel 11. After such repetition, larger microparticles will flow out together with a small number of smaller microparticles from the outlet channel 17 located on the inner side of the arc-shaped channel 11 along the curved direction and the fluid outlet 14 communicated thereto after multistage transition, while a greater number of the majority of the smaller microparticles will flow out from the outlet channel 17 on the outer side of the arc-shaped channel 11 along the curved direction and the fluid outlet 14 communicated thereto, to realize sorting. The application example is suitable for the type of demand where the target microparticles to be enriched are larger than other microparticles and are relatively small in number.

Figure 5:
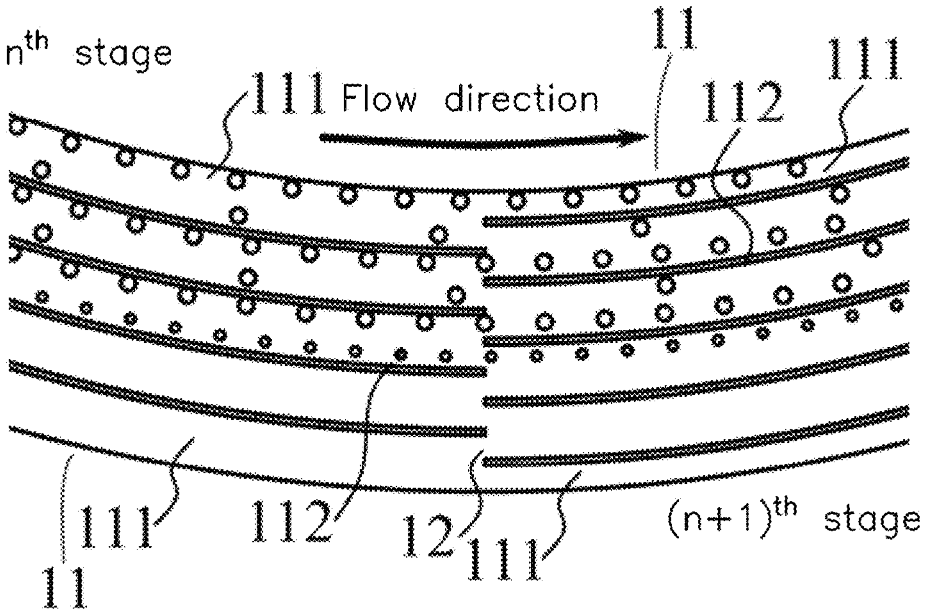
FIG. 5 is a partial schematic diagram of another structure of a step-type inertial focusing microfluidic chip provided in the embodiments of the present application.

As an application example of the structure shown in FIG. 5, during use, the sample fluid is introduced from the inlet channel 16 located on the inner side of the arc-shaped channel 11 along the curved direction and the fluid inlet 13 communicated thereto, and the buffer is introduced from the inlet channel 16 located on the outer side of the arc-shaped channel 11 along the curved direction and the fluid inlet 13 communicated thereto. After the transition effect of the previous $(n-1)^{th}$ stage of the arc-shaped channel 11, microparticles in the sample are located in three sub-channels 111 on the inner side of the $n^{th}$ stage of the arc-shaped channel 11 along the curved direction, and the buffer fills the two sub-channels 111 on the outer side. Wherein all the microparticles with a smaller particle size and some microparticles with a larger particle size are located in a middle sub-channel adjacent to the inner side of the arc-shaped channel 11 along the curved direction (the third sub-channel 111 counted from the inside to the outside, the same below), and the remaining microparticles with a larger particle size are located in the two sub-channels 111 on the innermost side of the arc-shaped channel 11 along the curved direction after the previous $(n-1)^{th}$ stage transition sorting. In the middle sub-channel, due to the joint effect of inertial focusing and Dean drag force, larger microparticles are all located on the inner side of the sub-channel 111, while smaller microparticles are migrated to the outer side of the sub-channel 111. When all the liquid passes through the connecting position 12 of the $n^{th}$ stage of the arc-shaped channel 11 and the $(n+1)^{th}$ stage of the arc-shaped channel 11 to enter the $(n+1)^{th}$ stage of the arc-shaped channel 11, liquid in the middle sub-channel of the $n^{th}$ stage of the arc-shaped channel 11 is shunted clearly: all the smaller microparticles in the sub-channel 111 transition into the sub-channel 111 in the more outer side of the $(n+1)^{th}$ stage of the arc-shaped channel 11 (the fourth sub-channel 111 counted from the inside to the outside), while the larger microparticles still enter the middle sub-channel of the $(n+1)^{th}$ stage of the arc-shaped channel 11. After such repetition, smaller microparticles will flow out together with a small number of larger microparticles from the outlet channel 17 located on the outer side of the arc-shaped channel 11 along the curved direction and the fluid outlet 14 communicated thereto after multistage transition, while a greater number of the majority of the larger microparticles will flow out from the outlet channel 17 on the inner side of the arc-shaped channel 11 along the curved direction and the fluid outlet 14 communicated thereto, to realize sorting. The application example is suitable for the type of demand where the target microparticles to be enriched are smaller than other microparticles and are relatively small in number.

Figure 6A:
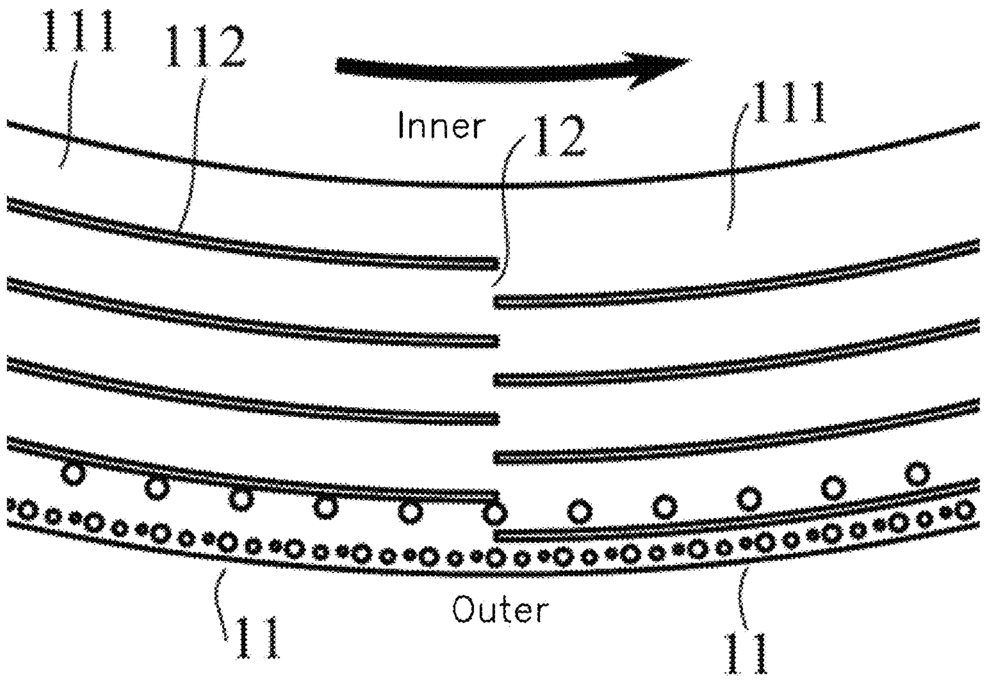
FIG. 6A is a first partial schematic diagram of yet another structure of a step-type inertial focusing microfluidic chip provided in the embodiments of the present application.
Figure 6B:
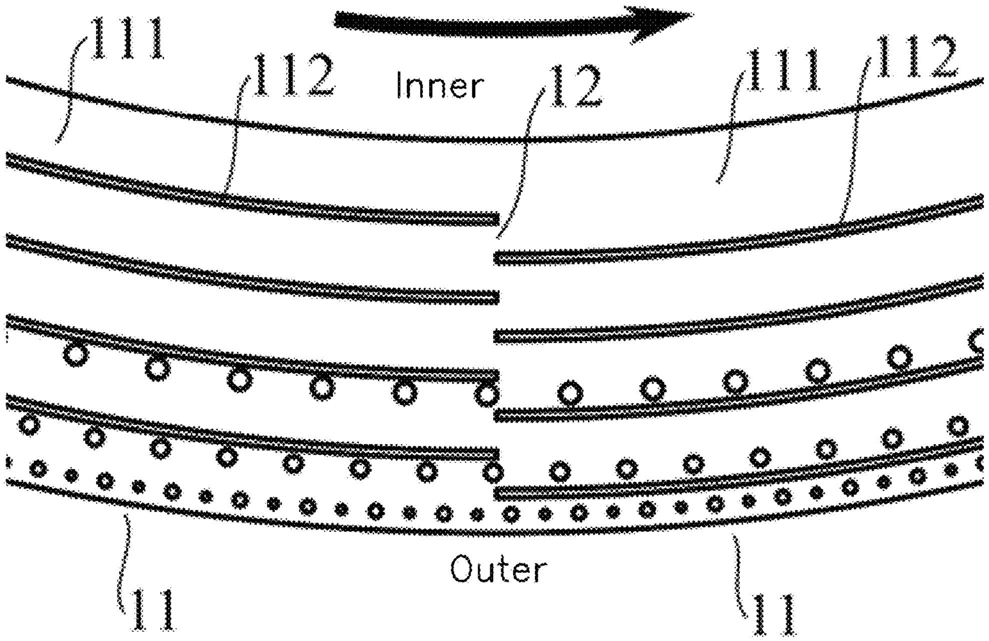
FIG. 6B is a second partial schematic diagram of yet another structure of a step-type inertial focusing microfluidic chip provided in the embodiments of the present application.
Figure 6C:
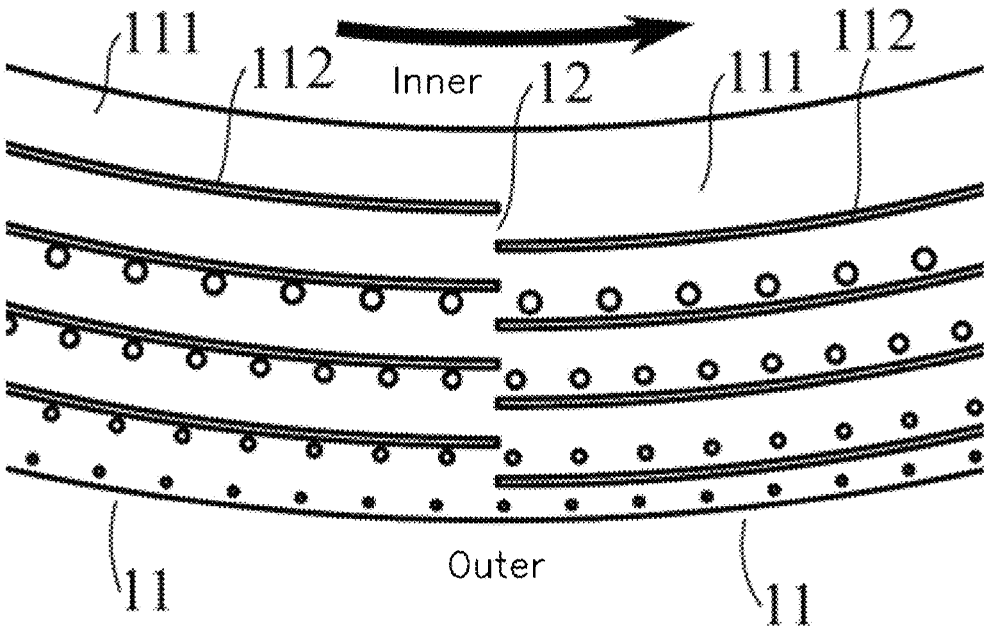
FIG. 6C is a third partial schematic diagram of yet another structure of a step-type inertial focusing microfluidic chip provided in the embodiments of the present application.

As an application example of the structure shown in FIGS. 6*a* to 6*c*, among the five sub-channels 111 of each stage of the arc-shaped channel 11, the cross-sectional shape of the sub-channel 111 located on the outermost side of the arc-shaped channel 11 along the curved direction (the first sub-channel 111) is a right-angled trapezoid which is shallow inside and deep outside, i.e., in the same right-angled trapezoid, the height of the cross section adjacent to the inner side of the arc-shaped channel 11 along the curved direction (forming the small base) is less than the height of the cross section away from the outer side of the arc-shaped channel 11 along the curved direction (forming the large base). Meanwhile, the cross-sectional width of the first sub-channel 111 of the same stage of the arc-shaped channel 11 gradually becomes wider from upstream to downstream; the cross-sectional height of the first sub-channel 111 of the next-stage of the arc-shaped channel 11 is smaller than the cross-sectional height of the first sub-channel 111 of the previous stage of the arc-shaped channel 11, i.e., the first sub-channel 111 becomes shorter from upstream to downstream stage by stage. The cross-sectional shapes of the remaining sub-channels 111 (the second sub-channel 111, the third sub-channel 111, the fourth sub-channel 111, and the fifth sub-channel) of each stage of the arc-shaped channel 11 are all rectangles, wherein as the sub-channel 111 located on the innermost side of the arc-shaped channel 11 along the curved direction (the fifth sub-channel 111), the cross-sectional width of the fifth sub-channel 111 of the same stage of the arc-shaped channel 11 gradually becomes narrower from upstream to downstream. The cross-sectional width and cross-sectional height of the remaining sub-channels 111 (the second, third and fourth sub-channels 111) of the previous stage of the arc-shaped channel 11 are equal to the cross-sectional width and cross-sectional height of the corresponding sub-channels 111 (the second, third and fourth sub-channels 111) of the next stage of the arc-shaped channel 11, respectively, i.e., the second, third and fourth sub-channels 111 maintain the same cross-sectional dimensions from upstream to downstream.

During use, the sample fluid is introduced from the inlet channel 16 arranged on the outer side of the arc-shaped channel 11 along the curved direction and the fluid inlet 13 communicated thereto, and the buffer is introduced from the inlet channel 16 arranged on the inner side of the arc-shaped channel 11 along the curved direction and the fluid inlet 13 communicated thereto. Wherein sample fluid contains a, b, c and d microparticles ranging from large to small particle size.

Referring to FIG. 6A, under the displacement of the buffer, the sample fluid carrying a, b, c, and d enters the first sub-channel 111 of the aforementioned first stage of the arc-shaped channel 11. At a given flow rate, microparticles a are accumulated on the inner side of the first sub-channel 111 along the curved direction, while microparticles b, c, and d are accumulated on the outer side of the first sub-channel 111 along the curved direction under the Dean confinement effect; at the connecting position 12 between the first stage of the arc-shaped channel 11 and the second stage of the arc-shaped channel 11, due to the effect of the aforementioned structure, only the confined microparticles (b, c, and d) may enter the first sub-channel 111 of the second stage of the arc-shaped channel 11. The largest microparticles a transition from the first sub-channel 111 of the first stage of the arc-shaped channel 11 into the second sub-channel 111 of the second stage of the arc-shaped channel 11.

Referring to FIG. 6B, in the first sub-channel 111 of the second stage of the arc-shaped channel 11, the largest microparticles b are accumulated on the inner side of the sub-channel 111 along the curved direction, and the remaining microparticles c and d are accumulated on the outer side of the sub-channel 111 along the curved direction under the Dean confinement effect; at the connecting position 12 between the second stage of the arc-shaped channel 11 and the third stage of the arc-shaped channel 11, due to the effect of the aforementioned structure, only the confined microparticles (c and d) may enter the first sub-channel 111 of the third stage of the arc-shaped channel 11, the microparticles b transition from the first sub-channel 111 of the second stage of the arc-shaped channel 11 into the second sub-channel 111 of the third stage of the arc-shaped channel 11, and microparticles a then further transition into the third sub-channel 111 of the third stage of the arc-shaped channel 11 from the second sub-channel 111 of the second stage of the arc-shaped channel 11.

Referring to FIG. 6C, similarly, after accumulation/confinement of the third stage of the arc-shaped channel 11 and the transition effect of the connecting position 12 between the third stage of the arc-shaped channel 11 and the fourth stage of the arc-shaped channel 11, microparticles d, c, b and a respectively enter and are maintained in the first, second, third and fourth sub-channels 111 of the fourth stage of the arc-shaped channel 11, and each type of microparticles respectively occupy a sub-channel 111, to realize the purpose of sorting. Finally, the four sub-channels 111 of the fourth stage of the arc-shaped channel 11 are respectively connected to the four fluid outlets 14, to respectively output four types of microparticles to different containers.

As an application example of the structure shown in FIGS. 7$a$ to 7$c$, the cross-sectional shapes of the four sub-channels 111 of each stage of the arc-shaped channel 11 are all rectangles, and the cross-sectional height of the same stage of sub-channels 111 gradually decreases from the inside to the outside along the curved direction of the arc-shaped channel 11, i.e., the cross-sectional height of the sub-channel 111 located on the inner side is larger than the cross-sectional height of the sub-channel 111 on the outer side, thereby forming a distribution structure of deep inside and shallow outside. Wherein the cross-sectional width of the sub-channel 111 (e.g., the $(i-1)^{th}$ sub-channel 111) on the outer side of the $i^{th}$ sub-channel 111 of the $i^{th}$ stage of the arc-shaped channel 11 is smaller than the cross-sectional width of the $i^{th}$ sub-channel 111. Exemplarily, the sub-channel 111 located on the innermost side of the arc-shaped channel 11 along the curved direction is able to ensure the flow rate of each sub-channel 111 and regulate the total flow rate of each section of the arc-shaped channel 11, such that the two may be consistent.

During use, the sample fluid is introduced from the inlet channel 16 arranged on the outer side of the arc-shaped channel 11 along the curved direction and the fluid inlet 13 communicated thereto, and the buffer is introduced from the inlet channel 16 arranged on the inner side of the arc-shaped channel 11 along the curved direction and the fluid inlet 13 communicated thereto. Wherein the sample fluid contains a, b, c and d microparticles ranging from large to small particle size.

Figure 7A:
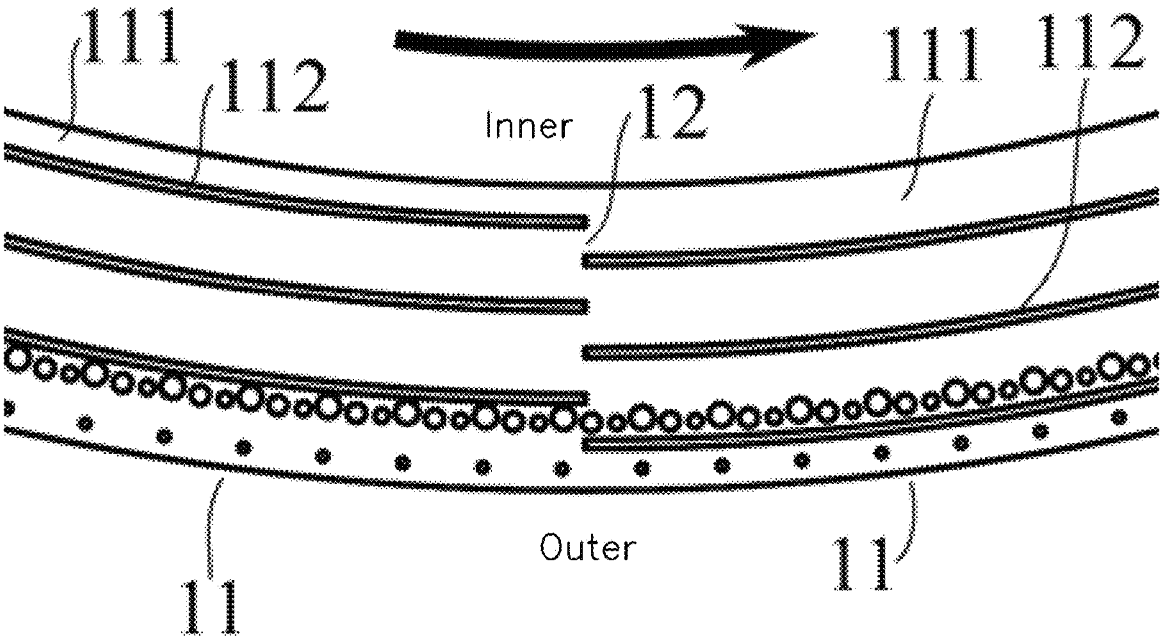
FIG. 7A is a first partial schematic diagram of yet another structure of a step-type inertial focusing microfluidic chip provided in the embodiments of the present application.

Referring to FIG. 7A, under the displacement of the buffer, the sample fluid carrying a, b, c, and d enters the first sub-channel 111 of the aforementioned first stage of the arc-shaped channel 11. At a given flow rate, microparticles a, b and c are accumulated on the inner side of the first sub-channel 111 along the curved direction, while microparticles d are accumulated on the outer side of the first sub-channel 111 along the curved direction under the effect of the Dean vortex; at the connecting position 12 between the first stage of the arc-shaped channel 11 and the second stage of the arc-shaped channel 11, due to the effect of the aforementioned structure, only the microparticles d which are carried outwards by the Dean vortex may enter the first sub-channel 111 of the second stage of the arc-shaped channel 11. The remaining microparticles b, c and d then transition inwards into the second sub-channel 111 of the second stage of the arc-shaped channel 11 from the first sub-channel 111 of the first stage of the arc-shaped channel 11.

Figure 7B:
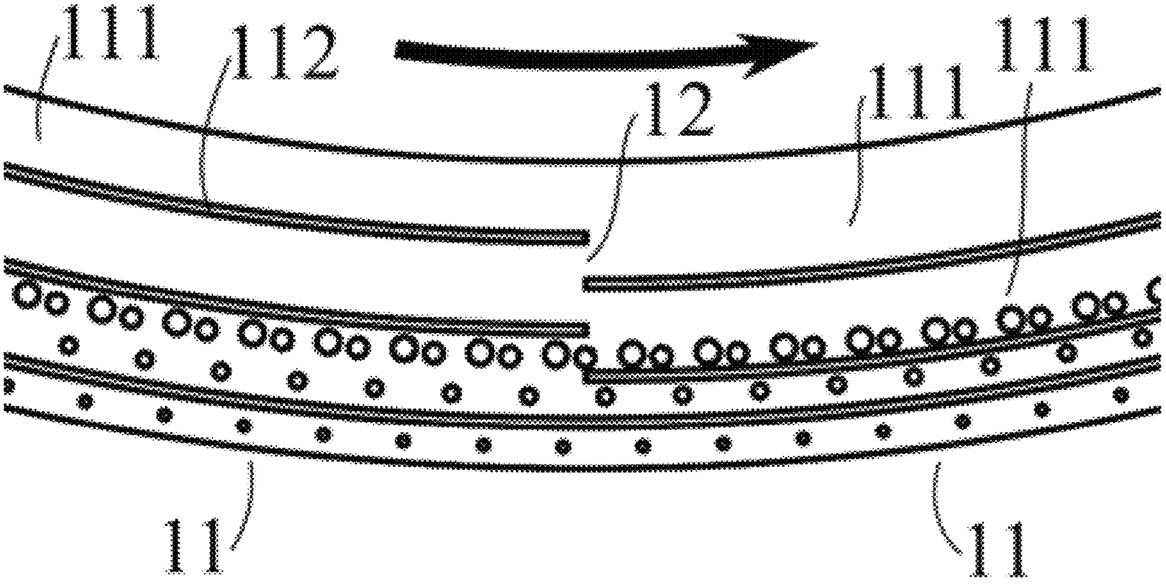
FIG. 7B is a second partial schematic diagram of yet another structure of a step-type inertial focusing microfluidic chip provided in the embodiments of the present application.

Referring to FIG. 7B, in the second sub-channel 111 of the second stage of the arc-shaped channel 11, microparticles a and b are accumulated on the inner side of the sub-channel 111 along the curved direction, and smallest microparticles care accumulated on the outer side of the sub-channel 111 along the curved direction under the effect of the Dean vortex; at the connecting position 12 between the second stage of the arc-shaped channel 11 and the third stage of the arc-shaped channel 11, due to the effect of the aforementioned structure, only the microparticles c which are carried to the outer side by the Dean vortex may enter the second sub-channel 111 of the third stage of the arc-shaped channel 11. The microparticles a and b then transition inwards into the third sub-channel 111 of the third stage of the arc-shaped channel 11 from the second sub-channel 111 of the second stage of the arc-shaped channel 11, and microparticles d directly enter the first sub-channel 111 of the third stage of the arc-shaped channel 11 from the first sub-channel 111 of the second stage of the arc-shaped channel 11 due to direct connection between two stages of the sub-channels 111.

Figure 7C:
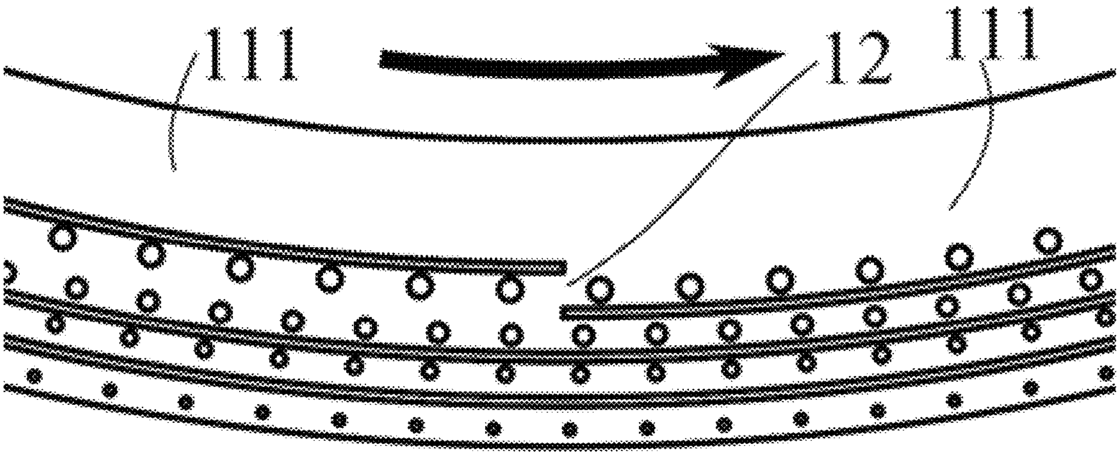
FIG. 7C is a third partial schematic diagram of yet another structure of a step-type inertial focusing microfluidic chip provided in the embodiments of the present application.

Referring to FIG. 7C, similarly, after Dean vortex effect of the third stage of the arc-shaped channel 11 and the transition effect of the connecting position 12 between the third stage of the arc-shaped channel 11 and the fourth stage of the arc-shaped channel 11, microparticles d, c, b and a respectively enter and are maintained in the first, second, third and fourth sub-channels 111 of the fourth stage of the arc-shaped channel 11, and each type of microparticles respectively occupy a sub-channel 111, to realize the purpose of sorting. Finally, the four sub-channels 111 of the fourth stage of the arc-shaped channel 11 are respectively connected to the four outlet channels 17 and the fluid outlets 14 communicated thereto, to respectively output four types of microparticles to different containers.

Exemplarily, the two stages of the arc-shaped channel 11 which have multiple sub-channels 111 respectively and which are connected to each other may have an equal or unequal number of sub-channels 111. In some optional embodiments, two stages of the arc-shaped channel 11 which have multiple sub-channels 111 respectively and which are connected to each other may have an unequal number of sub-channels 111; wherein, as to the first stage of the arc-shaped channel 11 with fewer sub-channels 111, the cross-sectional width of the sub-channel 111 has a gradually changed structure, which may effectively reduce the overall width of the arc-shaped channel 11.

In some embodiments, the features of the arc-shaped channel may be designed to achieve the purpose of the application. Exemplarily, the radius of curvature of the arc-shaped channel 11 is 2-50 mm. Exemplarily, the cross-sectional width of the arc-shaped channel 11 ranges from 50 to 5000 microns and the cross-sectional height ranges from 20 to 2000 microns.

Exemplarily, the last stage of the multistage arc-shaped channel 11 has multiple sub-channels 111, such that the sorting liquid in each sub-channel 111 is directly output to the outlet channel 17 and the fluid outlet 14 communicated thereto, and the application effect is satisfactory.

Some typical application examples will be introduced briefly below.

Referring to FIG. 2B, as an application example, the microfluidic chip in the present example includes a four stages of arc-shaped channel 11, two inlet channels 16 and fluid inlets 13 communicated thereto, and two outlet channels 17 and fluid outlets 14 communicated thereto, the four stage of the arc-shaped channel 11 forms two spirals 1*a*, each spiral 1*a* contains two stages of the arc-shaped channel 11, and the spirals are connected into a whole by a straight channel 15. Each stage of the arc-shaped channel 11 is in 1.8 to 2.2 turns, and four stages of the arc-shaped channel 11 are in 7 to 9 turns in total.

Wherein the first stage of the arc-shaped channel 11 has an inner and an outer sub-channel 111. The cross-sectional shape of the outer sub-channel is a rectangle, the cross-sectional width is 800 microns, the depth is 160 microns, and the designed flow rate $l_0$ is 0.8 to 3.0 ml/min; the cross-sectional shape of the inner sub-channel is also a rectangle, and the cross-sectional dimension is configured such that the flow rate of the sub-channel 111 is equal to 2.1 times the designed flow rate $l_0$ of the outer sub-channel.

Wherein the second stage of the arc-shaped channel 11 has an inner, a middle and an outer sub-channel 111. The cross-sectional dimension of the middle sub-channel is consistent with the outer sub-channel of the first stage of the arc-shaped channel 11; the cross-sectional dimension of the inner sub-channel of the second stage of the arc-shaped channel 11 is configured such that the flow rate of the sub-channel 111 is reduced by 0.7 $l_0$ compared with the inner sub-channel of the first stage of the arc-shaped channel 11; and the cross-sectional dimension of the outer sub-channel of the second stage of the arc-shaped channel 11 is configured such that the flow rate of the sub-channel 111 is equal to 0.7 $l_0$.

Wherein the third stage of the arc-shaped channel 11 also has an inner, a middle and an outer sub-channel 111. The cross-sectional dimension of the middle sub-channel is consistent with the outer sub-channel of the first stage of the arc-shaped channel 11; the cross-sectional dimension of the inner sub-channel of the third stage of the arc-shaped channel 11 is configured such that the flow rate of the sub-channel 111 is reduced by 0.7 $l_0$ compared with the inner sub-channel of the second stage of the arc-shaped channel 11; and the cross-sectional dimension of the outer sub-channel of the third stage of the arc-shaped channel 11 is configured such that the flow rate of the sub-channel 111 is equal to two times the flow rate of the outer sub-channel of the second stage of the arc-shaped channel 11.

Wherein the fourth stage of the arc-shaped channel 11 has an inner and an outer sub-channel 111. The cross-sectional dimension and flow rate of the inner sub-channel are the same as those of the outer sub-channel of the first stage of the arc-shaped channel 11, and correspondingly, the flow rate of the outer sub-channel 111 is also the same as the inner sub-channel of the first stage of the arc-shaped channel 11, i.e., 2.1 $l_0$. Exemplarily, the cross-sectional width of the sub-channel 111 on the inner side of the first stage of the arc-shaped channel 11 and the outer side of the fourth stage of the arc-shaped channel 11 has a gradually changed structure, which may reduce the overall width of the arc-shaped channel 11.

One specific application of the microfluidic chip may be as follows: trace circulating tumor cells, fetal cells, and other circulating abnormal cells that do not belong to blood cells are sorted from whole blood of human peripheral blood for in vitro diagnosis. For example, the whole blood sample is introduced from the inlet channel 16 located on the outer side of the arc-shaped channel 11 along the curved direction and the fluid inlet 13 communicated thereto at a flow rate of 0.5 $l_0$ (about 1.0 ml/min), and the PBS buffer is introduced from the inlet channel 16 located on the inner side of the arc-shaped channel 11 along the curved direction and the fluid inlet 13 communicated thereto at a flow rate of 2.6 $l_0$. In the first stage of the arc-shaped channel 11, the whole blood sample enters the outer sub-channel and occupies ½ of the region on the outer side of the outer sub-channel; the remaining regions of the outer sub-channel and all the regions of the inner sub-channel are occupied by the buffer.

When the whole blood sample flows to the tail end of the first stage of the arc-shaped channel 11, the circulating abnormal cells with a larger particle size appear in ⅓ of the region on the inner side of the outer sub-channel under the effect of inertial focusing, while the blood cells fill the entire arc-shaped channel 11 under the effect of Dean flow; when the fluid flows into the second stage of the arc-shaped channel 11, the sample located in ⅓ of the region on the inner side of the outer sub-channel of the first stage of the arc-shaped channel 11 transitions inwards into the middle sub-channel of the second stage of the arc-shaped channel 11, and the remaining samples enter the outer sub-channel of the second stage of the arc-shaped channel 11.

Since the middle sub-channel of the second stage of the arc-shaped channel 11 is consistent with the outer sub-channel of the first stage of the arc-shaped channel 11, the movement state of the sample in the two sub-channels is the same. However, since the number of blood cells in the middle sub-channel decreases to ⅓ of the number of blood cells in the outer sub-channel of the first stage of the arc-shaped channel 11, some gaps with only circulating abnormal cells will exist on the inner side of the tail end of the middle sub-channel under the effect of Dean flow.

Figure 8:
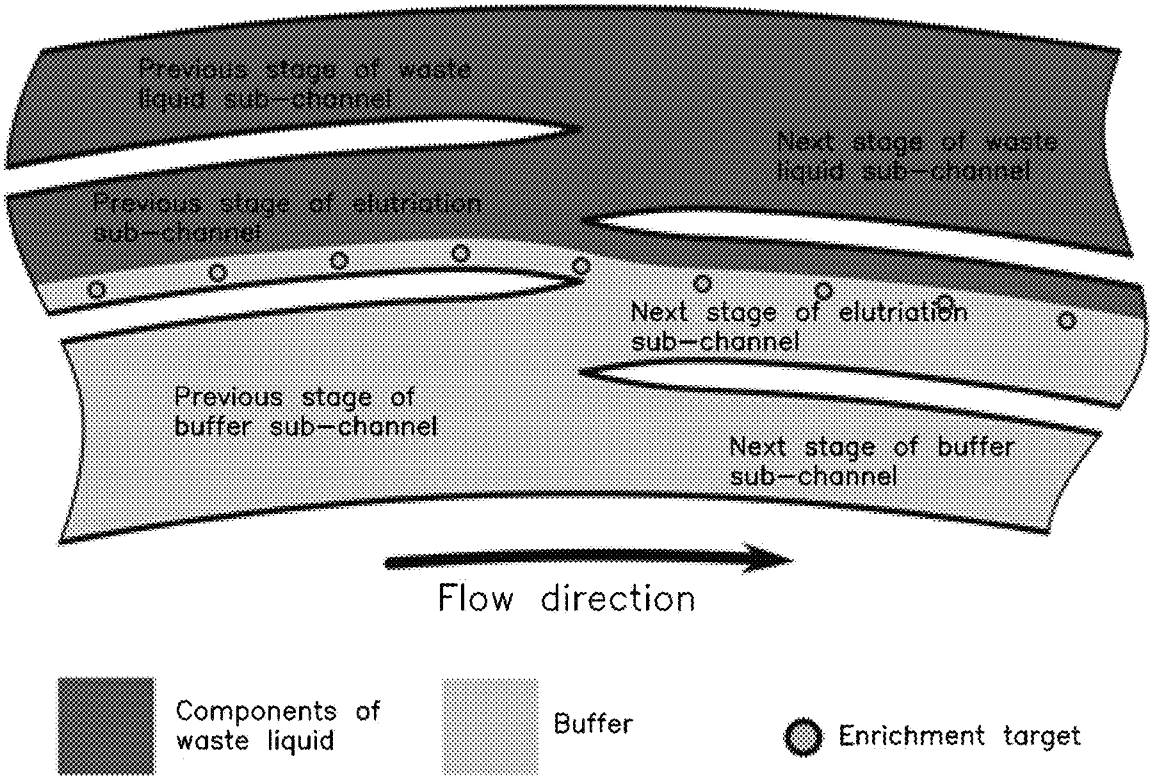
FIG. 8 is a schematic diagram of a partial state of an application example of a step-type inertial focusing microfluidic chip provided in the embodiments of the present application.

Referring to FIG. 8, upon entering the third stage of the arc-shaped channel 11, circulating abnormal cells (enrichment target) continue to transition into the middle sub-channel of the third stage of the arc-shaped channel 11, while more blood cells enter the outer sub-channel under the shunting effect. Upon entering the fourth arc-shaped channel 11, the circulating abnormal cells transition into the inner sub-channel of the fourth stage of the arc-shaped channel 11, at this time, only a small number of blood cells follow the circulating abnormal cells and enter the inner sub-channel, and the majority of blood cells are shunted into the outer sub-channel of the fourth stage of the arc-shaped channel 11. At the tail end of the fourth stage of the arc-shaped channel 11, the circulating abnormal cells are focused in ⅓ of the region on the inner side of the inner sub-channel of the fourth stage of the arc-shaped channel 11, and the trace amount of blood cells contained in the sub-channel 111 will be migrated to the ⅔ region on the outer side of the sub-channel 111. The cross-sectional dimension of the outlet channel 17, which is located on the inner side of the fourth stage of the arc-shaped channel 11 and is connected to the tail end of the fourth stage of the arc-shaped channel 11, is configured such that the fluid outlet 14 which is communicated to the outlet channel 17 may only receive the fluid in ⅓ of the region on the inner side of the inner sub-channel of the fourth stage of the arc-shaped channel 11, and the remaining fluid of the inner sub-channel of the fourth stage of the arc-shaped channel 11 is completely discharged into the outlet channel 17 located on the outer side of the fourth stage of the arc-shaped channel 11 and the fluid outlet 14 communicated with the outlet channel 17, to achieve enrichment of circulating abnormal cells.

Figure 9:
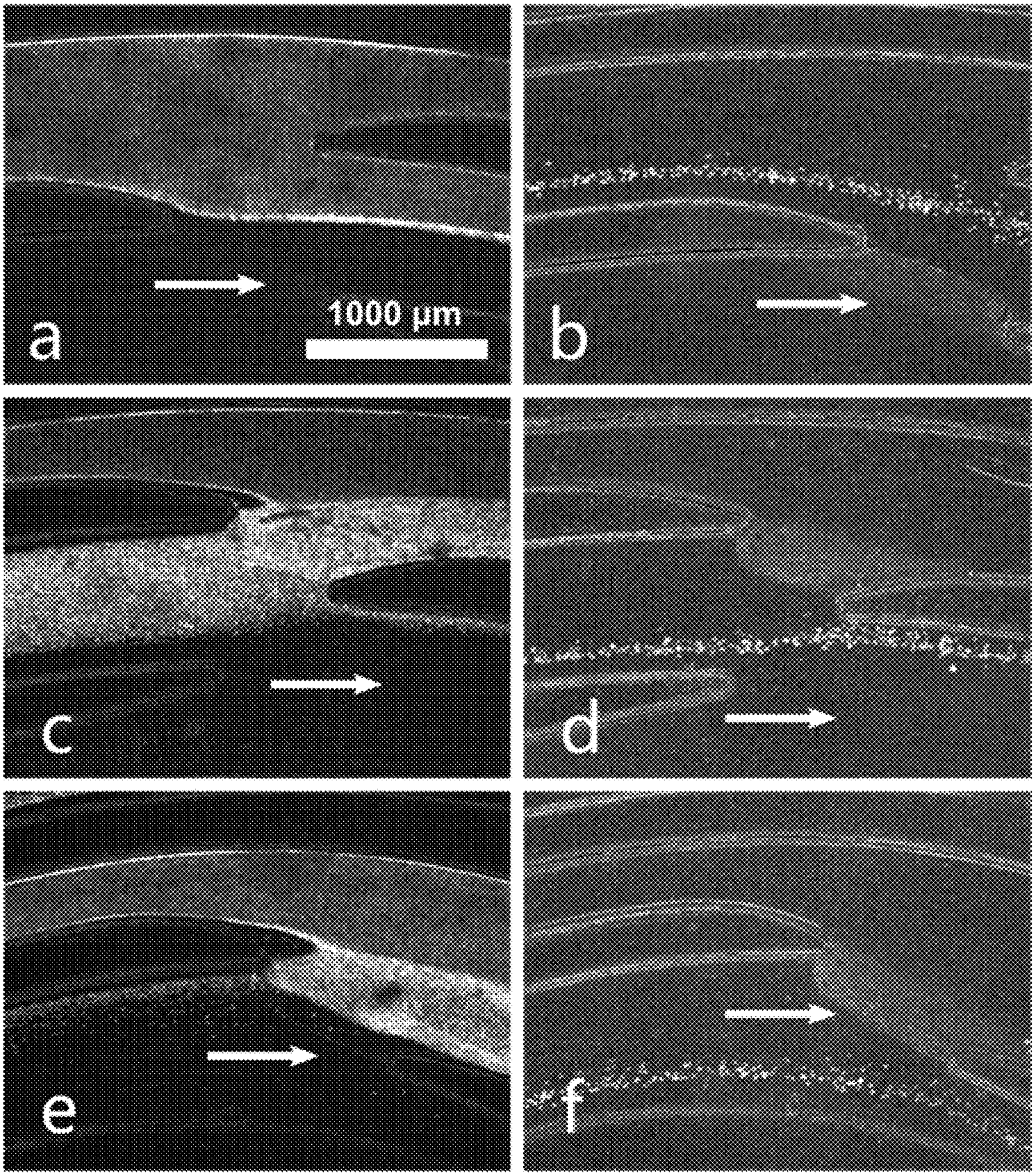
FIG. 9 is a schematic diagram of a microscopic state of an application example of a step-type inertial focusing microfluidic chip provided in the embodiments of the present application.

FIG. 9 discloses a microscopic state of a microfluidic chip of the present application example when the microfluidic chip is actually used. FIG. 9*a* shows the flow of the blood sample at the connecting position 12 between the first stage of the arc-shaped channel 11 and the second stage of the arc-shaped channel 11. It can be seen that blood cells fill the tail end of the outer sub-channel of the first stage of the arc-shaped channel 11, and when entering the second stage of the arc-shaped channel 11 on the right, part of the blood cells enter the outer sub-channel of the second stage of the arc-shaped channel 11, while part of the blood cells enter the middle sub-channel of the second stage of the arc-shaped channel 11. FIG. 9*b* shows the flow of a typical cancer cell line A549 at the connecting position 12 between the first stage of the arc-shaped channel 11 and the second stage of the arc-shaped channel 11 under the configuration of the same inlet flow rate. It can be seen that the cancer cell lines are accumulated at the tail end of the outer sub-channel of the first stage of the arc-shaped channel 11, and the cancer cell lines are accumulated in the inner region of the sub-channel 111; when the cancer cell lines enter the second stage of the arc-shaped channel 11 located on the right, all the cancer cell lines enter the middle sub-channel of the second stage of the arc-shaped channel 11. FIG. 9*c* shows the flow of blood samples at the connecting position 12 between the third stage of the arc-shaped channel 11 and the fourth stage of the arc-shaped channel 11. It can be seen that a large number of blood cells fill the outer sub-channel of the third stage of the arc-shaped channel 11 at this time, a small number of blood cells are accumulated on the outer side of the tail end of the middle sub-channel of the third stage of the arc-shaped channel 11, and an obvious cell-free region exists on the inner side of the middle sub-channel; upon entering the fourth stage of the arc-shaped channel 11 on the right, most of the blood cells enter the outer sub-channel of the fourth-level arc-shaped channel 11, and only a small number of blood cells enter the inner sub-channel. FIG. 9*d* shows the flow of A549 at the connecting position 12 between the third stage of the arc-shaped channel 11 and the fourth stage of the arc-shaped channel 11. At the tail end of the middle sub-channel of the third stage of the arc-shaped channel 11, the cancer cell lines are still accumulated in the inner region of the sub-channel 111; upon entering the fourth stage of the arc-shaped channel 11 on the right, all the cancer cell lines transition into the inner sub-channel of the fourth stage of the arc-shaped channel 11. FIG. 9*e* shows the flow of the blood sample at the connecting position between the tail end of the fourth stage of the arc-shaped channel 11 and the outlet channel 17. It can be seen that only a small number of blood cells are located on the outer side of the tail end of the inner sub-channel of the fourth stage of the arc-shaped channel 11 at this time, a wide cell-free region exists on the inner side of the sub-channel 111, and after passing through the connecting region, the small number of blood cells and the blood cells in the outer sub-channel of the fourth stage of the arc-shaped channel 11 enter the waste outlet channel 17 located at the upper right. FIG. 9*f* shows the flow of A549 at the connecting position of the tail end of the fourth stage of the arc-shaped channel 11 and the outlet channel 17. It can be seen that at the tail end of the inner sub-channel of the fourth stage of the arc-shaped channel 11, cancer cell lines are still accumulated in the inner region of the sub-channel 111; upon entering the outlet channel 17 on the right, all the cancer cell lines enter the target cell enrichment outlet channel 17 on the inner side along the curved direction. In combination with the performance of blood cells and larger cancer cells in various positions in FIG. 9, when a trace amount (1-100) of cancer cells are mixed in blood cells, after passing through the microfluidic chip of the present application example, the cancer cells will flow out through the inner outlet channel 17 of the chip, while other blood cells will flow out through the outer outlet channel 17, so as to achieve the purpose of enriching circulating abnormal cells. Practice has proven that in the present application example, enrichment of whole blood circulating abnormal cells at an ultra-high throughput of 1 ml/min may be achieved through a single microfluidic chip, and the processing time of each sample is dramatically reduced to less than 10 minutes, thereby having significant application advantages.

Figure 10:
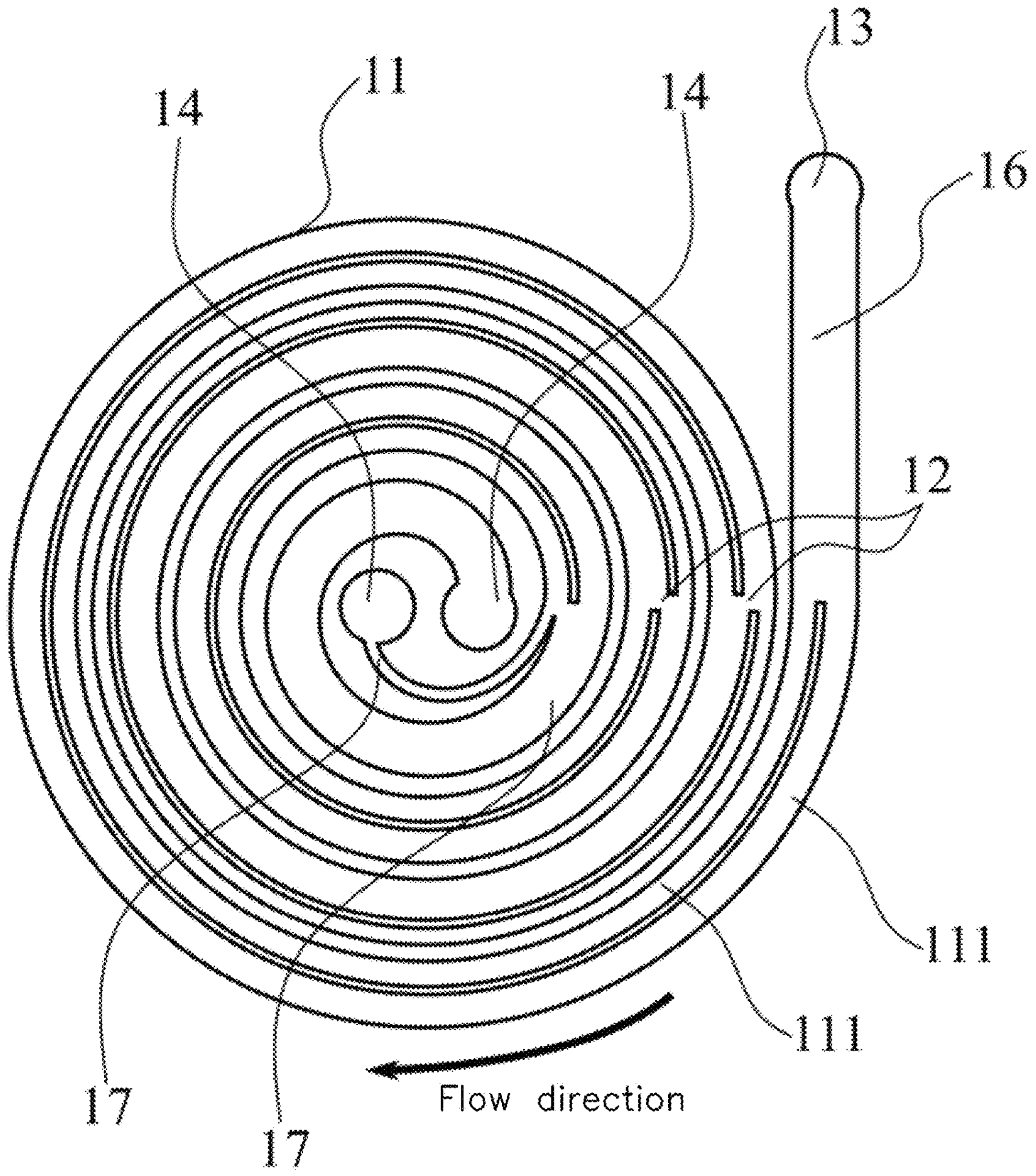
FIG. 10 is a structural schematic diagram of yet another structure of a step-type inertial focusing microfluidic chip provided in the embodiments of the present application.

Referring to FIG. 10, as another application example, the microfluidic chip in the present example has three stages of arc-shaped channel 11, an inlet channel 16 and a fluid inlet 13 communicated thereto, and two outlet channels 17 and a fluid outlet 14 communicated thereto. Wherein, each stage of arc-shaped channel 11 is composed of two sub-channels 111 having rectangular cross sections, and the cross-sectional height of each sub-channel 111 is 130 microns respectively. The cross-sectional widths of the inner and outer sub-channels 111 of the first stage of the arc-shaped channel 11 and the third stage of the arc-shaped channel 11 are respectively 400 and 600 microns, and the widths of the inner and outer sub-channels 111 of the second stage of the arc-shaped channel 11 are 600 and 400 microns. The radius of curvature of the arc-shaped channel 11 located on the innermost side of the spiral 1*a* is 7.5 mm, and the radius of curvature of the outermost arc-shaped channel 11 is 15 mm. The cross-sectional depths of the inlet channel 16 and the outlet channel 17 are respectively consistent with the cross-sectional depths of the correspondingly connected sub-channels 111, and the ratio of cross-sectional widths of the outlet channels 17 on the inner and outer sides of the arc-shaped channel 11 along the curved direction is 1:8. In the flow rate range with a total flow rate of 1.8-2.4 ml/min, any sub-channel 111 in the three stages of arc-shaped channel 11 may focus cells with diameters in the range of 9-15 microns to the inner side of the sub-channel 111.

One specific application of the microfluidic chip may be to separate cellular metabolites such as peptides, proteins, bioactive enzymes, antibodies and the like from their culture solution in a bioreactor. For example, after entering the first stage of the arc-shaped channel 11 from the fluid inlet 13 and the inlet channel 16, the culture solution containing cultured cells will be divided into two parts and flow into two sub-channels 111 of the first stage of the arc-shaped channel 11 respectively; under the effect of inertial focusing, the cells will be focused in the inner region of each sub-channel 111 adjacent to the curved direction when the cells flow to the tail end of the first stage of the arc-shaped channel 11. When the liquid flows from the first stage of the arc-shaped channel 11 into the second stage of the arc-shaped channel 11, the focused cells that were originally in the outer sub-channel of the first stage of the arc-shaped channel 11 will flow into the inner sub-channel of the second stage of the arc-shaped channel 11. At the tail end of the second stage of the arc-shaped channel 11, all the cells will be focused in the inner region of the inner sub-channel of the second stage of the arc-shaped channel 11 adjacent to the curved direction. After the fluid enters the third stage of the arc-shaped channel 11, all the cells are still in the inner sub-channel of the third stage of the arc-shaped channel 11, but since the sub-channel 111 is narrowed and the flow rate is decreased, the cells therein will be further adjacent to the inner side of the sub-channel 111 under the effect of inertial focusing, and flow out through the outlet channel 17 at the inner side along the curved direction, and finally flow back to the bioreactor through the fluid outlet 14 communicated with the outlet channel 17. The remaining approximately 90% of the cell-free solution flows out through the outlet channel 17 on the outer side along the curved direction, and is collected by the fluid outlet 14 communicated with the outlet channel 17 and concentrated for recovery.

The operation in the present application example may be performed continuously without damage to cells, and is applicable to small and medium-sized bioreactors. When further concentration or increased throughput is required, an increase in the number of sub-channels 111 and the number of stages of the arc-shaped channel 11 may be considered, depending on actual usage requirements.

Referring to FIG. 11, as still another application example, the microfluidic chip in the present example has two stages of arc-shaped channel 11, an inlet channel 16 and a fluid inlet 13 communicated thereto, and two outlet channels 17 and a fluid outlet 14 communicated thereto. Wherein, the first stage of the arc-shaped channel 11 is a single-channel arc-shaped channel 11B with a cross-sectional height of 130 microns and a cross-sectional width of 800 microns; the second stage of the arc-shaped channel 11 is a multichannel arc-shaped channel 11A, the cross-sectional heights and widths of the inner and outer sub-channels 111 of the multichannel arc-shaped channel 11A are respectively 130 microns and 300 microns. The radius of curvature of the arc-shaped channel 11 located on the innermost side of the spiral 1*a* is 7.5 mm, and the radius of curvature of the outermost arc-shaped channel 11 is 15 mm. The cross-sectional depths of the inlet channel 16 and the outlet channel 17 are respectively consistent with the cross-sectional depths of the correspondingly connected sub-channels 111, and the ratio of cross-sectional widths of the outlet channels 17 on the inner and outer sides of the arc-shaped channel 11 along the curved direction is 1:5. In the flow rate range with a total flow rate of 1.0-1.6 ml/min, any sub-channel 111 in the multichannel arc-shaped channel 11A may focus cells with diameters in the range of 12-15 microns to the inner side of the sub-channel 111.

One specific application of the microfluidic chip may be to separate cellular metabolites such as peptides, proteins, bioactive enzymes, antibodies and the like from their culture solution in a bioreactor. For example, after entering the first stage of the arc-shaped channel 11 from the fluid inlet 13, the culture solution containing cultured cells will be focused in the inner region adjacent to the curved direction when flowing to the tail end of the first stage of the arc-shaped channel 11 under the effect of inertial focusing. When the liquid flows from the first stage of the arc-shaped channel 11 into the second stage of the arc-shaped channel 11, the focused cells that were originally on the inner side of the first stage of the arc-shaped channel 11 will flow into the inner sub-channel of the second stage of the arc-shaped channel 11. At the tail end of the second stage of the arc-shaped channel 11, all the cells will be focused in the inner region of the inner sub-channel of the second stage of the arc-shaped channel 11 adjacent to the curved direction, flow out through the outlet channel 17 at the inner side along the curved direction, and finally flow back to the bioreactor through the fluid outlet 14 communicated with the outlet channel 17. The remaining approximately 90% of the cell-free solution flows out through the outlet channel 17 on the outer side along the curved direction, and is collected by the fluid outlet 14 communicated with the outlet channel 17 and concentrated for recovery.

The operation in the present application example may be performed continuously without damage to cells, and is applicable to small and medium-sized bioreactors. When further concentration or increased throughput is required, an increase in the number of sub-channels 111 and the number of stages of the arc-shaped channel 11 may be considered, depending on actual usage requirements.

Figure 12:
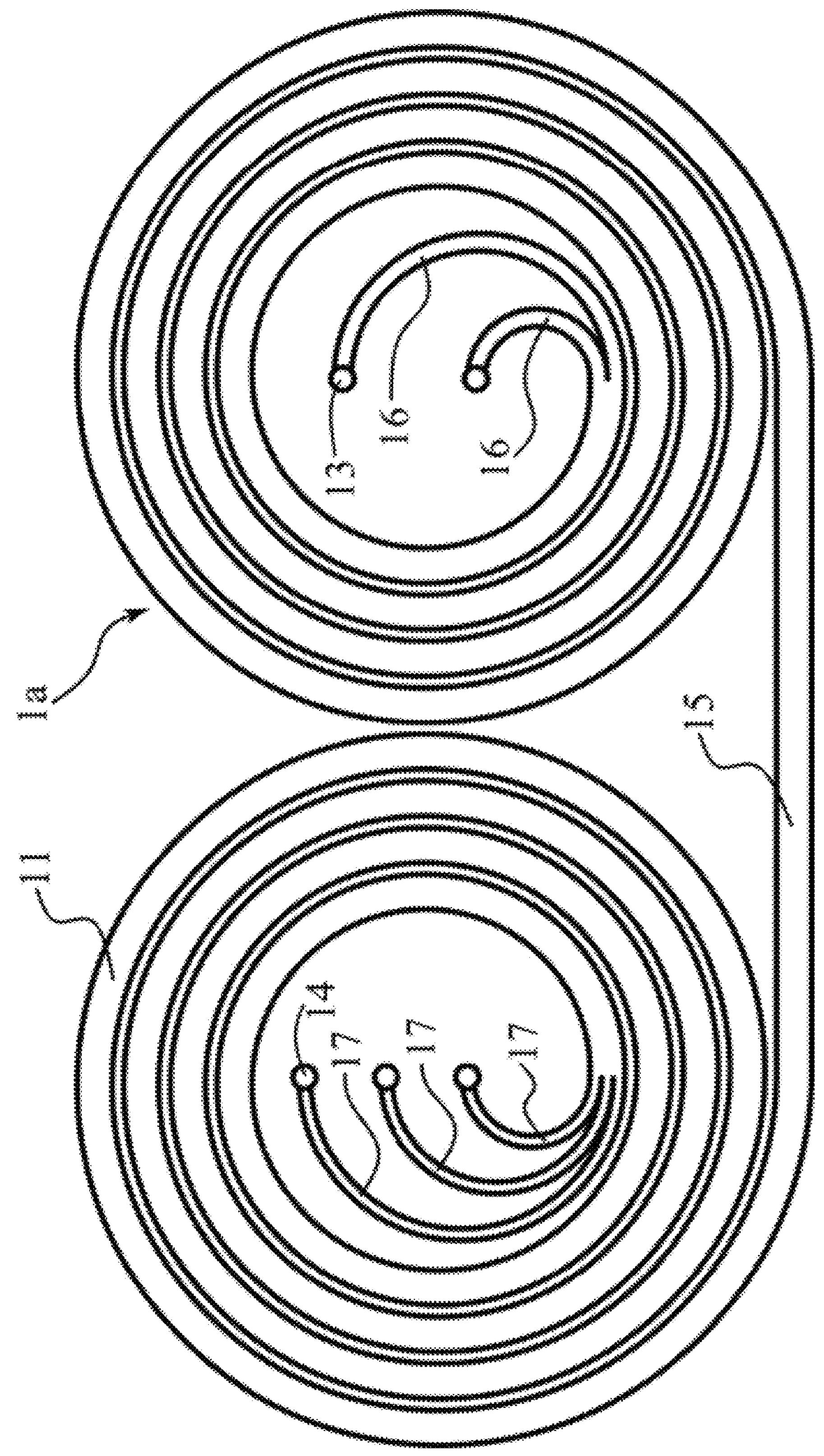
FIG. 12 is a structural schematic diagram of yet another structure of a step-type inertial focusing microfluidic chip provided in the embodiments of the present application (the distribution of sub-channels is not shown).

Referring to FIG. 12, as still another application example, the microfluidic chip in the present example has three stages of arc-shaped channel 11, two inlet channels 16 and a fluid inlet 13 communicated thereto, and three outlet channels 17 and a fluid outlet 14 communicated thereto. The three stages of arc-shaped channel 11 form two spirals 1*a*, one of the spirals 1*a* includes one stage of arc-shaped channel 11, the stage of arc-shaped channel 11 is in four turns; the other spiral 1*a* includes two stages of arc-shaped channel 11, and each stage of the arc-shaped channel 11 is in 1.8-2.2 turns; three stages of arc-shaped channel 11 are in 7-9 turns in total, the radius of curvature of the arc-shaped channel 11 ranges from 7.5 mm to 15 mm, and the two spirals 1*a* are serially connected through a straight channel 15.

The first stage of the arc-shaped channel 11 includes two sub-channels 111 having a rectangular cross section with the cross-sectional height being 80 microns, and the cross-sectional widths of the inner and outer sub-channels 111 are respectively 450 microns and 400 microns. The second stage of the arc-shaped channel 11 includes two sub-channels 111 having a rectangular cross section with the cross-sectional height being 120 microns, and the cross-sectional widths of the inner and outer sub-channels 111 are respectively 500 microns and 220 microns. The third stage of the arc-shaped channel 11 includes an inner, a middle and an outer sub-channels 111, the cross-sectional shapes of the outer sub-channel and the middle sub-channel are both rectangles with a cross-sectional depth of 120 microns and cross-sectional widths of respectively 220 microns and 330 microns, more-over, the outer sub-channel is directly connected with the outer sub-channel of the second stage of the arc-shaped channel 11; the inner sub-channel of the third stage of the arc-shaped channel 11 has a right-angled trapezoid cross section which is shallow inside and deep outside, the cross-sectional height on the inner side is 70 microns, the cross-sectional height on the outer side is 90 microns, and the cross-sectional width is 500 microns.

One specific application of the microfluidic chip may be to separate white blood cells, red blood cells and platelets in a blood sample. For example, the blood sample may be first diluted to 1/10 of the original concentration (i.e., the volume becomes 10 times the original volume) and subsequently flows in at a flow rate of 0.2 ml/min from the inlet channel 16 located on the outer side and the fluid inlet 13 communicated with the inlet channel 16; at the same time, the buffer flows in at a flow rate of 3.2 ml/min from the inlet channel 16 located on the inner side and the fluid inlet 13 communicated with the inlet channel.

Upon entering the first stage of the arc-shaped channel 11, the blood sample will occupy 1/8 of the width region on the outer side of the outer sub-channel of the stage; the buffer will be divided into two parts, with one part flowing into the outer sub-channel at a flow rate of approximately 1.4 ml/min and the remaining flowing into the inner sub-channel at a flow rate of approximately 1.8 ml/min. At the tail end of the first stage of the arc-shaped channel 11, the red and white blood cells in the blood sample will be accumulated in the inner region of the outer sub-channel (i.e., the region of the outer sub-channel adjacent to the inner sub-channel), while the smaller platelets will follow the Dean vortex to go through the entire Dean cycle and return to the outer region of the outer sub-channel (i.e., the region of the outer sub-channel away from the inner sub-channel). When entering the second stage of the arc-shaped channel 11 from the first stage of the arc-shaped channel 11, the fluid in about 40% of the region on the inner side of the outer sub-channel of the first stage of the arc-shaped channel 11 will enter the inner sub-channel of the second stage of the arc-shaped channel 11 and occupy about 25% of the region on the outer side of the inner sub-channel (i.e., the region of the inner sub-channel adjacent to the outer sub-channel); correspondingly, the red blood cells and white blood cells focused in about 40% of the region of the inner side of the outer sub-channel of the first stage of the arc-shaped channel 11 will also transition to the inner sub-channel of the second stage of the arc-shaped channel 11 accordingly.

At the tail end of the second stage of the arc-shaped channel 11, since the cross-sectional height of the inner sub-channel is increased, only white blood cells may be focused on the inner region of the sub-channel 111 (i.e., the region where the inner sub-channel is away from the outer sub-channel), while the red blood cells will return to the outer region of the sub-channel 111 along with the Dean vortex. When entering the third stage of the arc-shaped channel 11 from the second stage of the arc-shaped channel 11, the fluid located in the inner sub-channel of the second stage of the arc-shaped channel 11 will be divided into two parts, the inner part flows into the inner sub-channel of the third stage of the arc-shaped channel 11 at a flow rate of about 1.0 ml/min, and the outer part flows into the middle sub-channel of the third stage of the arc-shaped channel 11 at a flow rate of about 1.4 ml/min. Due to the large space occupied by the sample when entering the inner sub-channel of the second stage of the arc-shaped channel 11 and the diffusion movement of cells during the flow process, the red blood cells will not be completely shunted into the middle sub-channel of the third stage of the arc-shaped channel 11, and a small number of red blood cells will enter the inner sub-channel of the third stage of the arc-shaped channel 11 along with all the focused white blood cells.

In the inner sub-channel of the third stage of the arc-shaped channel 11, the white blood cells will be focused to the inner region of the sub-channel 111 (i.e., the region of the inner sub-channel away from the middle sub-channel), while the red blood cells will be confined to the deeper outer region of the sub-channel 111 (i.e., the region of the inner sub-channel adjacent to the middle sub-channel) under the effect of the Dean confinement, when the sample flows out from the fluid outlet 14, this part of the red blood cells will be merged with the red blood cells in the middle sub-channel, and flow through the outlet channel 17 and the fluid outlet 14 arranged in the middle. The white blood cells focused in the inner sub-channel of the third stage of the arc-shaped channel 11 will flow out of the inner outlet channel 17 and the fluid outlet 14 at a flow rate of about 0.25 ml/min together with the inner buffer. The outer sub-channel will be directly connected to the outer outlet channel 17 and will carry platelets out at a flow rate of about 1 ml/min, thereby finally achieving complete separation of three blood components.

Referring to FIG. 12, as still another application example, the microfluidic chip in the present example has three stages of arc-shaped channel 11, two inlet channels 16 and a fluid inlet 13 communicated thereto, and three outlet channels 17 and a fluid outlet 14 communicated thereto. The three stages of arc-shaped channel 11 form two spirals 1*a*, one of the spirals 1*a* includes all of the first stage of the arc-shaped channel 11 (3 turns in total) and a part of the second stage of the arc-shaped channel 11 (1 turn), the other spiral 1*a* includes the remaining part of the second stage of the arc-shaped channel 11 (1.5 turns) and all of the third stage of the arc-shaped channel 11 (2.5 turns in total); and the three stage of the arc-shaped channel 11 are in 8 turns in total, and two spirals 1*a* are serially connected through a straight channel 15.

One specific application of the microfluidic chip may be to sort microsphere samples with diameters ranging from 10 to 13 microns into 3 categories: 10 to 11 microns, 11 to 12 microns, and 12 to 13 microns in the samples with a concentration of 100,000 particles/μl.

The first stage of the arc-shaped channel 11 has two sub-channels 111. The cross-sectional shape of the outer sub-channel is a right-angled trapezoid, the cross-sectional height on the inner side is 80 microns, the cross-sectional height on the outer side is 120 microns, and the cross-sectional width is 600 microns; the cross-sectional shape of the inner sub-channel is a rectangle, with a cross-sectional height of 140 microns and a cross-sectional width of 300 microns; and the ratio of the flow rate of the inner sub-channel to the flow rate of the outer sub-channel is 1.1:1.5.

The second stage of the arc-shaped channel 11 has two sub-channels 111, the cross-sectional shapes of the two sub-channels 111 are both right-angled trapezoids, the cross-sectional height on the inner side of any sub-channel 111 is 80 microns, the cross-sectional height on the outer side is 120 microns, and the cross-sectional width is 600 microns. The straight channel 15 which is arranged between the two parts of the second stage of the arc-shaped channel 11 also has two sub-channels 111; wherein the cross-sectional shape of the inner sub-channel is a rectangle, with a cross-sectional height of 120 microns and a cross-sectional width of 600 microns, wherein the cross-sectional shape of the outer sub-channel is a rectangle, with a cross-sectional height of 80 microns and a cross-sectional width of 600 microns. Under the influence of the impedance difference of this straight channel, the ratio of the flow rate of the inner sub-channel 111 and the flow rate of the outer sub-channel 111 of the second stage of the arc-shaped channel 11 is 1.5:1.1.

The third stage of the arc-shaped channel 11 has an inner, a middle and an outer sub-channel 111. Wherein the cross-sectional shape of the inner sub-channel is a rectangle, with a cross-sectional height of 140 microns and a cross-sectional width of 300 microns; the cross-sectional shape of the middle sub-channel is a right-angled trapezoid, the cross-sectional height on the inner side is 80 microns, the cross-sectional height on the outer side is 120 microns, and the cross-sectional width is 600 microns; the cross-sectional shape of the outer sub-channel is a rectangle, with a cross-sectional height of 130 microns and a cross-sectional width of 300 microns; and the ratio of the flow rate of the inner sub-channel to the flow rate of the middle sub-channel to the flow rate of the outer sub-channel is 0.8:1.1:0.7.

During sorting, the sample is introduced from the inlet channel 16 on the outer side and the fluid inlet 13 communicated thereto at a flow rate of less than 1.5 ml/min, and the buffer is introduced from the inlet channel 16 on the inner side and the fluid inlet 13 communicated thereto at a constant flow rate, such that the total flow rate introduced into the arc-shaped channel 11 is 2.6 ml/min, and the sample is completely introduced into the outer sub-channel of the first stage of the arc-shaped channel 11. Under this flow rate configuration, microspheres with diameters of 12-13 microns will be focused in the inner region of the outer sub-channel of the first stage of the arc-shaped channel 11, while microspheres with diameters of 10 to 12 microns will be confined in the outer region of the outer sub-channel by the Dean vortex.

When entering the second stage of the arc-shaped channel 11, due to the change of the flow rate ratio of the inner and outer sub-channels 111, the microspheres with diameters of 12-13 microns and focused on the inner side of the outer sub-channel of the first stage of the arc-shaped channel 11 will transition to the inner sub-channel of the second stage of the arc-shaped channel 11. Since the microspheres with diameters of 10-12 microns are relatively close to those with diameters of 12-13 microns, the microspheres with diameters of 12-13 microns will entrain a trace amount of microspheres with diameters of 11-12 microns when the microspheres with diameters of 12-13 microns are focused on the inner side of the outer sub-channel of the first stage of the arc-shaped channel 11, and simultaneously transition to the inner sub-channel of the second stage of the arc-shaped channel 11; in the transition process, the entrainment effect is broken, in the inner sub-channel of the second stage of the arc-shaped channel 11, the microspheres with diameters of 10-12 microns will be confined in the outer region of the sub-channel 111 by the Dean vortex, and the microspheres focused on the shallower region on the inner side of the sub-channel 111 will be microspheres with diameters of 12-13 microns and with higher purity. As to the microspheres with diameters of 10-12 microns and shunted to the outer sub-channels of the second stage of the arc-shaped channel 11, since the cross-sectional shapes/dimensions of the front and rear stages of sub-channels 111 are the same but the flow rate is reduced, the microspheres with diameters of 11-12 microns will be focused in the inner region of the sub-channel 111, while the microspheres with relatively smaller diameters of 10-11 microns will be confined in the outer region of the sub-channel 111 by the Dean vortex.

When entering the third stage of the arc-shaped channel 11, according to the change of flow rate ratio of each sub-channel 111, the microspheres with diameters of 10-11 microns in the outer sub-channel of the second stage of the arc-shaped channel 11 will be continuously retained in the outer sub-channel of the third stage of the arc-shaped channel 11; while the microspheres with diameters of 11-12 microns and focused in the inner side of the outer sub-channel of the second stage of the arc-shaped channel 11 will transition to the outer region of the middle sub-channel of the third stage of the arc-shaped channel 11. Similar to the situation during the first transition, a trace amount of microspheres with diameters of 10-11 microns will be entrained in the transition process, and the entrainment effect is broken during the transition process. The microspheres with diameters of 12-13 microns and focused in the inner sub-channel of the second stage of the arc-shaped channel 11 will transition to the inner sub-channel of the third stage of the arc-shaped channel 11; and a trace amount of microspheres with diameters of 11-12 microns and confined in the outer region of the inner sub-channel of the second stage of the arc-shaped channel 11 will be shunted to the middle sub-channel of the third stage of the arc-shaped channel 11. In the middle sub-channel of the third stage of the arc-shaped channel 11, since the flow rate is consistent with the flow rate of the outer sub-channel of the second stage of the arc-shaped channel 11, microspheres with diameters of 11-12 microns will be focused in the inner region of the middle sub-channel of the third stage of the arc-shaped channel 11; while the microspheres with diameters of 10-11 microns and entrained to the middle sub-channel of the third stage of the arc-shaped channel 11 will be confined in the outer region of the sub-channel 111.

At the tail end of the third stage of the arc-shaped channel 11, the inner sub-channel is directly connected with the outlet channel 17 on the inner side, the microspheres with diameters of 12-13 microns will be directly led out and collected from the outlet channel 17 and the fluid outlet 14 communicated with the outlet channel 17, the middle outlet channel 17 merely collects microspheres with diameters of 11-12 microns and focused on the inner side of the middle sub-channel of the third stage of the arc-shaped channel 11, and the remaining microspheres with diameters of 10-11 microns flow out from the outlet channel 17 arranged on the outer side and the fluid outlet 14 communicated thereto, to achieve sorting.

Those skilled in the art may achieve sorting within different dimension ranges with higher or lower precision through fine adjustment of the flow rate of the microfluidic chip and the dimension of each sub-channel 111, and may achieve sorting with higher quality through repeated sorting and other methods.

Referring to FIG. 2A, as another application example, the microfluidic chip in the present example has two stages of arc-shaped channel 11, two inlet channels 16 and a fluid inlet 13 communicated thereto, two outlet channels 17 and a fluid outlet 14 communicated thereto. Each stage of the arc-shaped channel 11 is in two turns, two stages of the arc-shaped channel 11 are in four turns in total, and the radius of curvature of the arc-shaped channel 11 ranges from 7.5 to 15 mm.

Each stage of the arc-shaped channel 11 has two sub-channels 111, and the cross-sectional shapes of all the sub-channels 111 are all rectangles. The cross-sectional widths of the inner and outer sub-channels 111 of the first stage of the arc-shaped channel 11 are respectively 300 microns and 500 microns; and the second stage of the arc-shaped channel 11 is the opposite, the cross-sectional widths of the inner and outer sub-channels 111 are respectively 500 microns and 300 microns.

A specific application of the microfluidic chip may be as follows: when a cell sample is contaminated by relatively small-sized bacteria, viruses, etc., or when the establishment of a laboratory-level cell and a bacteria automatic culture system requires overall cleaning and liquid exchange, the sample is subjected to complete liquid exchange, and the specific process is shown as follows:

The sample with cells and the new cleaning solution are introduced at constant flow rates of approximately 0.5 ml/min and 3.5 ml/min from the inlet channel 16 on the outer side and the fluid inlet 13 communicated thereto as well as the inlet channel 16 on the inner side and the fluid inlet 13 communicated thereto, respectively, and after the sample and the new solution enter the first stage of the arc-shaped channel 11, the sample will occupy approximately ⅕ of the width of the outer sub-channel, and the new solution introduced from the inner side will occupy the remaining space in the inner sub-channel and the outer sub-channel. At the tail end of the first stage of the arc-shaped channel 11, the cells in the sample will be focused in ⅓ of the space on the inner side of the outer sub-channel, while the old solution in the sample will return to the outer region of the sub-channel 111 after completing a Dean vortex along with the Dean flow. Although the space occupied by components of the old solution exceeds ⅕ of the width of the outer sub-channel due to the effect of diffusion, the components of the old solution will be still controlled in ⅓ of the region on the outer side of the sub-channel 111.

When the liquid enters the second stage of the arc-shaped channel 11 from the first stage of the arc-shaped channel 11, about 40% of the fluid on the inner side of the outer sub-channel of the first stage of the arc-shaped channel 11 will be shunted into the inner sub-channel of the second stage of the arc-shaped channel 11; since all the cells are accumulated in this region of the first stage of the arc-shaped channel 11, all the cells then transition to the inner sub-channel of the second stage of the arc-shaped channel 11 and occupy about 40% of the space on the outer side of the sub-channel 111. The cells then leap to the inner sub-channel of the second stage of the arc-shaped channel 11 and occupy about 40% of the space on the outer side of the sub-channel 111, at this time, the rest of the old solution is shunted into the outer sub-channel of the second stage of the arc-shaped channel 11, except for a small amount of the old solution which is also entrained by the cells into the inner sub-channel of the second stage of the arc-shaped channel 11.

In the inner sub-channel of the second stage of the arc-shaped channel 11, the cells will be washed again as in the first stage of the arc-shaped channel 11, to further remove the residual old solution, and will finally be led out to a new collection container at a flow rate of 0.8 to 1 ml/min from the outlet channel 17 on the inner side and the fluid outlet 14 communicated thereto. The solution mixed with the old sample is discharged to a waste liquid pond from the outlet channel 17 on the outer side and the fluid outlet 14 communicated thereto.

Finally it should be noted that the above specific embodiments are merely intended to illustrate rather than limiting the technical solutions of the present application, although the present application is described in detail with reference to the examples, those skilled in the art should understand that modifications or equivalent substitutions may be made to the technical solutions of the present application without departing from the spirit and scope of the technical solutions of the present application, and such modifications or equivalent substitutions shall all fall within the scope of claims of the present application.

What is claimed is:

1. A step-type inertial focusing microfluidic chip comprising: an arc-shaped channel comprising multiple stages configured to be successively connected in series, wherein at least one stage of the arc-shaped channel is separated into a plurality of sub-channels which are configured to be distributed along a radial direction of the arc-shaped channel, a first end of the arc-shaped channel is provided with at least one fluid inlet and at least one inlet channel connecting the first end to the at least one fluid inlet, a second end of the arc-shaped channel is provided with a plurality of fluid outlets and a plurality of outlet channels, the plurality of outlet channels is configured to connect the second end to the plurality of fluid outlets; a radius of curvature of the arc-shaped channel is 2 to 50 mm; a cross-sectional dimension of the arc-shaped channel along the radial direction of the arc-shaped channel is defined as a cross-sectional width, a dimension of the arc-shaped channel in a normal direction to the radial direction is defined as a cross-sectional height, the cross-sectional width is 50 to 5000 microns, the cross-sectional height is 20 to 2000 microns, and a thickness of a sub-channel separation wall of each of the plurality of sub-channels is 10 to 1000 microns.

2. The step-type inertial focusing microfluidic chip of claim 1, wherein the arc-shaped channel is configured to form at least one spiral, and curving directions at different stages of the arc-shaped channel are the same as curving directions of the least one spiral.

3. The step-type inertial focusing microfluidic chip of claim 1, wherein the multistage arc-shaped channel is configured to form a plurality of spirals, adjacent ones of the plurality of spirals are connected through a serially connected channel, and a shape of the serially connected channel is a straight line or a curve.

4. The step-type inertial focusing microfluidic chip of claim 1, wherein a cross-sectional shape of each of the plurality of sub-channels comprises at least one of a rectangle, a right-angled trapezoid, and a right-angled triangle.

5. The step-type inertial focusing microfluidic chip of claim 1, wherein a quantity of the multiple stages of the arc-shaped channel is not less than a quantity of the plurality of fluid outlets, a quantity of the plurality of sub-channels of at least one stage of the arc-shaped channel is not less than the quantity of the plurality of fluid outlets, and different stages of the arc-shaped channel having the plurality of sub-channels are successively connected in series.

6. The step-type inertial focusing microfluidic chip of claim 1, wherein adjacent ones of the multiple stages of the arc-shaped channel are configured to be connected directly or connected in a transitional manner by a straight channel or a curved channel.

7. The step-type inertial focusing microfluidic chip of claim 1, wherein a last stage of the multiple stages of the arc-shaped channel is provided with the plurality of sub-channels.

8. The step-type inertial focusing microfluidic chip of claim 1, wherein the plurality of outlet channels is configured to be distributed in sequence at an output tail end of a last stage of the arc-shaped channel along a radial direction of the last stage of the arc-shaped channel; and each of the plurality of outlet channels is configured to drain outwards through a respective one of the plurality of fluid outlets.

9. The step-type inertial focusing microfluidic chip of claim 1, wherein the first end of the arc-shaped channel is configured to be provided with a plurality of the fluid inlets and a plurality of the inlet channels, the plurality of inlet channels are configured to distributed in sequence at an input end of a first stage of the arc-shaped channel along a radial direction of the first stage of the are-shaped channel; one of the inlet channels located on an innermost side or an outermost side along the radial direction of the first stage of the arc-shaped channel is a buffer inlet channel; and each of the plurality of inlet channels is configured to drain inwards through a respective one of the plurality of fluid inlets.

* * * * *